US012617545B2

(12) United States Patent
    Pettey

(10) Patent No.: US 12,617,545 B2
(45) Date of Patent: May 5, 2026

(54) AIRCRAFT LIQUID CONTAINMENT CELL INCLUDING SELF-SEALING STRUCTURE

(71) Applicant: Response Technologies, LLC, Coventry, RI (US)

(72) Inventor: David Allen Pettey, Portsmouth, RI (US)

(73) Assignee: RESPONSE TECHNOLOGIES, LLC, Coventry, RI (US)

(*) Notice: Subject to any disclaimer, the term of this patent is extended or adjusted under 35 U.S.C. 154(b) by 428 days.

(21) Appl. No.: 18/061,797

(22) Filed: Dec. 5, 2022

(65) Prior Publication Data

US 2023/0227172 A1     Jul. 20, 2023

Related U.S. Application Data

(63) Continuation-in-part of application No. 17/578,081, filed on Jan. 18, 2022, now Pat. No. 12,263,955.

(51) Int. Cl.
    B64D 37/04 (2006.01)
    B32B 1/00 (2024.01)
    (Continued)

(52) U.S. Cl.
    CPC ............... B64D 37/04 (2013.01); B32B 1/00 (2013.01); B32B 5/024 (2013.01); B32B 27/12 (2013.01); B32B 27/32 (2013.01); B64D 37/06 (2013.01); B32B 2250/05 (2013.01); B32B 2255/02 (2013.01); B32B 2255/26 (2013.01); B32B 2262/0253 (2013.01); B32B 2307/732 (2013.01); B32B 2307/746 (2013.01); B32B 2307/762 (2013.01); B32B 2605/18 (2013.01)

(58) Field of Classification Search
    None
    See application file for complete search history.

(56) References Cited

U.S. PATENT DOCUMENTS 2,401,627 A     6/1946   Eger
2,504,421 A     4/1950   Johnson et al.
    (Continued)

FOREIGN PATENT DOCUMENTS

WO     WO-2005021377 A1 *  3/2005    ............. B64D 37/06

OTHER PUBLICATIONS

"Advances in Self-Sealing Fuel Tank Technology," Defense Systems Information Analysis Center, vol. 3, No. 3, Summer 2016, 8 pages.
    (Continued)

*Primary Examiner* — James C Yager
*Assistant Examiner* — Thomas J Kessler
(74) *Attorney, Agent, or Firm* — SLATER MATSIL, LLP

(57)     ABSTRACT

A liquid containment cell includes an inner layer configured to contain a liquid, an outer layer, and a multilayer self-sealing structure disposed between the inner layer and the outer layer, where the multilayer self-sealing structure includes a plurality of sealing liner layers and further includes at least one slip layer disposed between adjacent sealing liner layers of the plurality of sealing liner layers. The at least one slip layer includes a polyethylene (PE) material, and the at least one slip layer is configured to permit at least one sealing liner layer of the plurality of sealing liner layers to move at least partially into a hole created by a projectile.

20 Claims, 16 Drawing Sheets

(51) Int. Cl.

| | |
|---|---|
| *B32B 5/02* | (2006.01) |
| *B32B 27/12* | (2006.01) |
| *B32B 27/32* | (2006.01) |
| *B64D 37/06* | (2006.01) |

(56) References Cited

U.S. PATENT DOCUMENTS

| | | | |
|---|---|---|---|
| 3,581,778 A | 6/1971 | Korejwa et al. | |
| 3,698,587 A | 10/1972 | Baker et al. | |
| 3,949,894 A | 4/1976 | Underwood | |
| 3,980,106 A | 9/1976 | Wiggins | |
| 4,088,240 A | 5/1978 | San Miguel | |
| 4,216,803 A | 8/1980 | Hall | |
| 4,368,086 A | 1/1983 | Villemain | |
| 5,858,556 A | 1/1999 | Eckert et al. | |
| 7,169,452 B1 | 1/2007 | Monk et al. | |
| 7,794,808 B2 | 9/2010 | Dudt et al. | |
| 9,694,629 B1* | 7/2017 | Dry | B32B 33/00 |
| 9,770,883 B1 | 9/2017 | Luzetsky | |
| 10,082,372 B1 | 9/2018 | Iliev | |
| 10,471,676 B1 | 11/2019 | Whipple | |
| 10,513,173 B1 | 12/2019 | Misciagna | |
| 2006/0151043 A1 | 7/2006 | Nanney et al. | |
| 2012/0298660 A1* | 11/2012 | Bongiovanni | F41H 5/0478 220/200 |
| 2015/0056391 A1 | 2/2015 | Dry | |
| 2015/0151630 A1* | 6/2015 | Bethea | C23C 28/042 220/562 |
| 2016/0303799 A1 | 10/2016 | Pettey et al. | |
| 2016/0347038 A1 | 12/2016 | Childress | |
| 2017/0057341 A1 | 3/2017 | Wilenski | |
| 2018/0010890 A1* | 1/2018 | Waldrop | F41H 5/0492 |
| 2021/0291486 A1 | 9/2021 | Wagner et al. | |
| 2022/0275885 A1 | 9/2022 | Cegalin et al. | |

OTHER PUBLICATIONS

Pratiksha, A.S. et al., "Self-Healing Thermoplastic Elastomeric Materials: Challenges, Opportunities and New Approaches," European Polymer Journal, vol. 181, Oct. 2022, 18 pages.

* cited by examiner

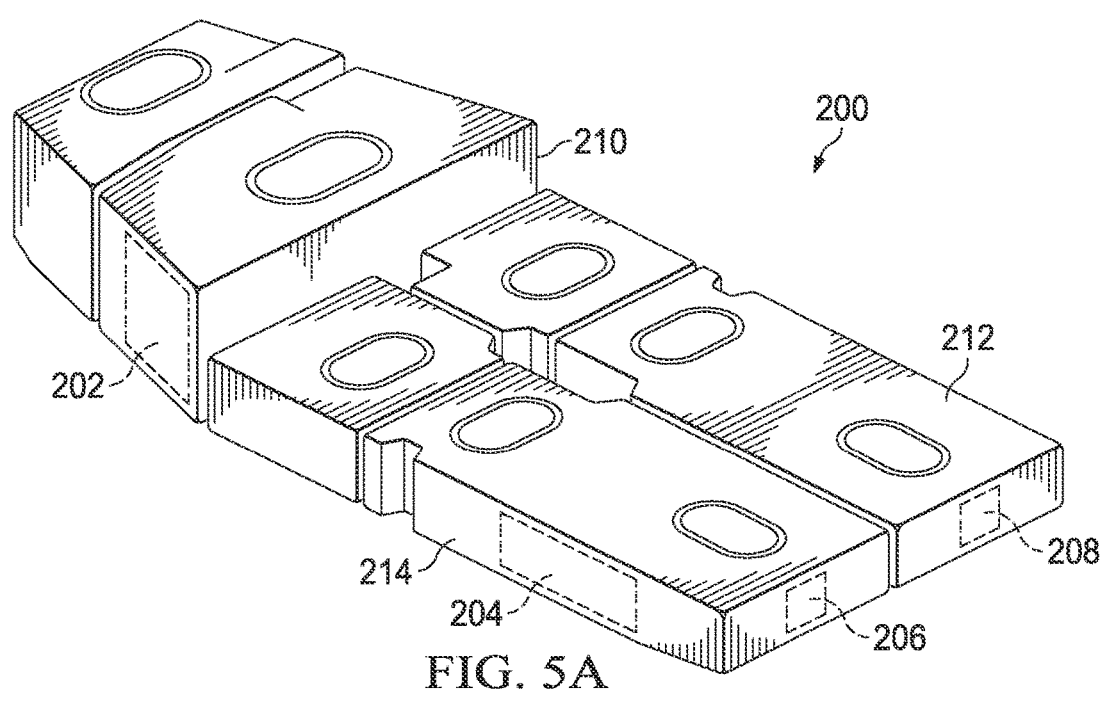
FIG. 5A
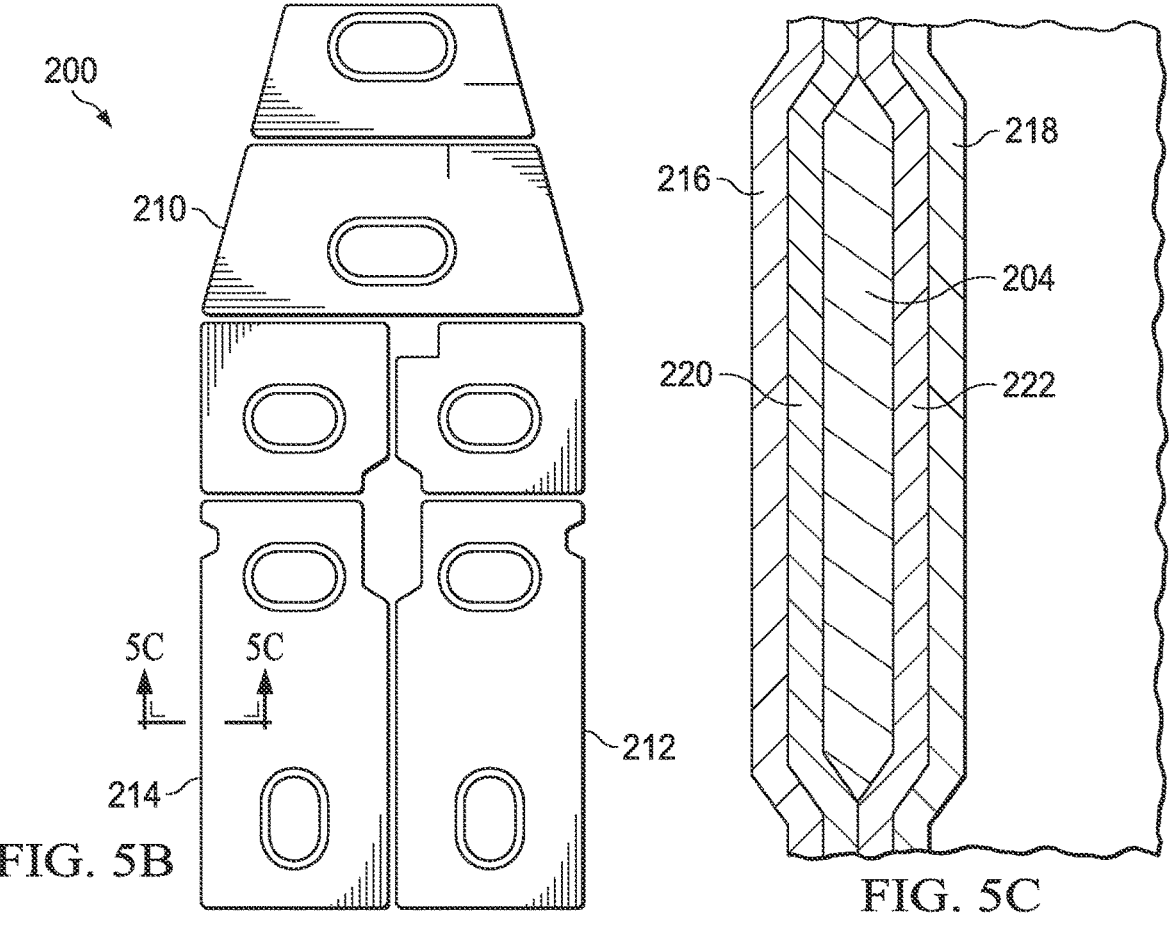
FIG. 5B
FIG. 5C

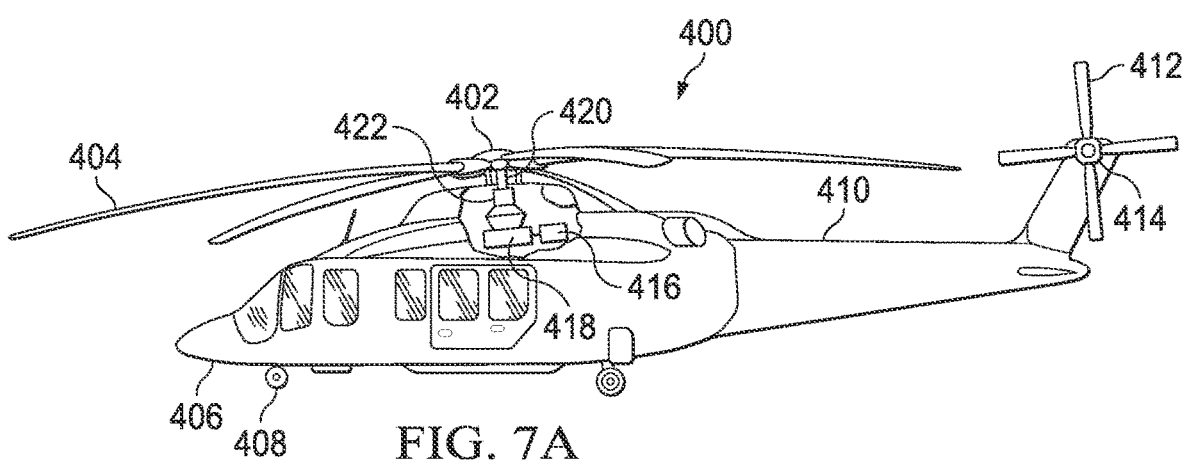
FIG. 7A
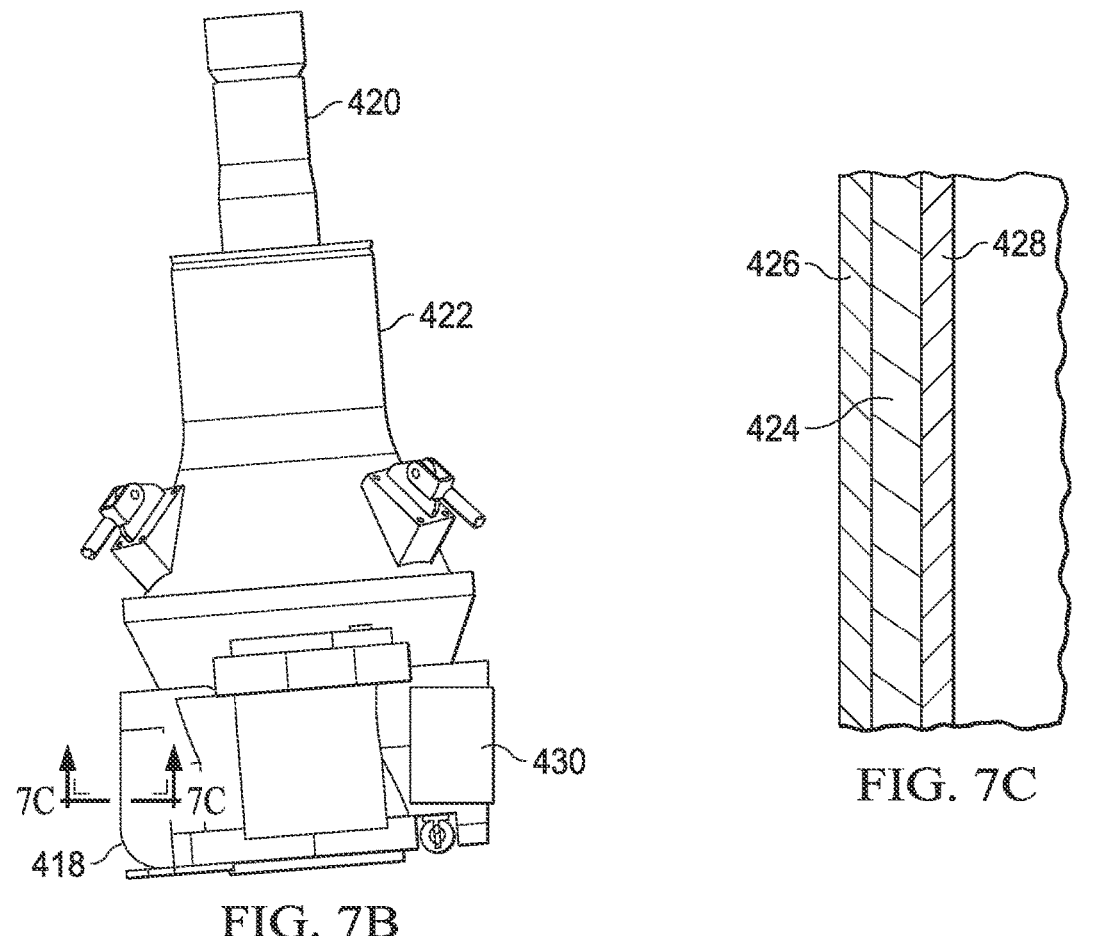
FIG. 7B
FIG. 7C

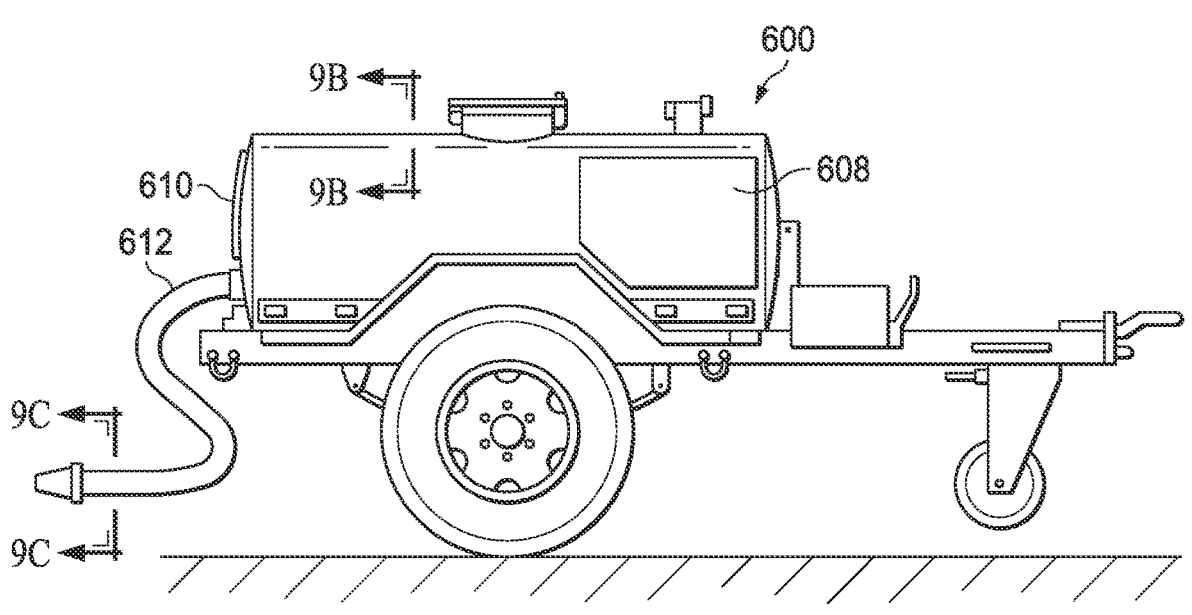
FIG. 9A
FIG. 9B
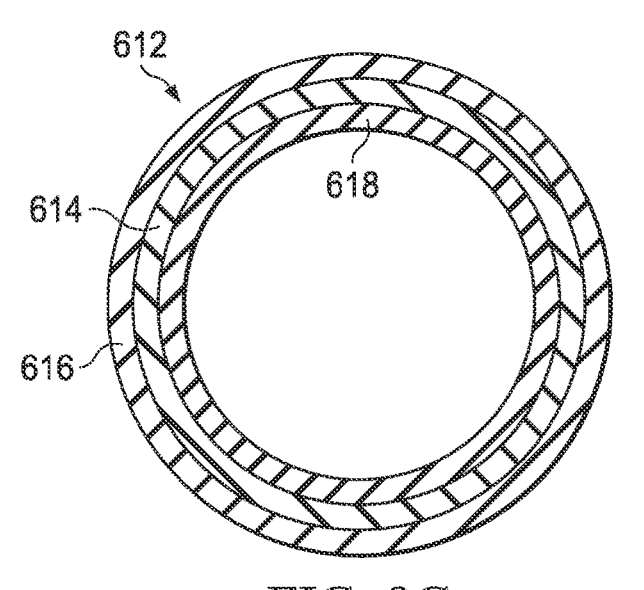
FIG. 9C

AIRCRAFT LIQUID CONTAINMENT CELL INCLUDING SELF-SEALING STRUCTURE

CROSS REFERENCE TO RELATED APPLICATIONS

This application is a Continuation-in-part of U.S. application Ser. No. 17/578,081, titled "Aircraft Fuel Tanks Including Self-Sealing Fabric," filed on Jan. 18, 2022, which is incorporated herein by reference in its entirety.

TECHNICAL FIELD

The present disclosure relates generally to the containment of liquids, such as fuel, within an enclosure and, in particular, to self-sealing fuel tanks which include textile structures or fabrics, such as woven or non-woven textiles, synthetic sheet material, non-oriented strand mats or sheets, or the like, on, or within, one or more walls of an enclosure, such as a fuel tank, the textile structures being selected to self-seal in response to the enclosure being punctured by an object, such as a projectile, thereby reducing leakage of a liquid from the enclosure.

BACKGROUND

In military and civilian applications, the leakage of liquid from a container after the container has been punctured can lead to financial loss, inconvenience, or even loss of life. While the reach of this problem touches many fields of application, one area in which leak prevention is particularly critical is the storage of fuel in fuel tanks. The fuel tanks may include flexible fuel bladders, rigid fuel tanks, fuel cells, and the like. In military applications for both ground and airborne vehicles, fuel tanks are at risk of being pierced by projectiles and the like (e.g., incoming fire, such as bullet rounds and shrapnel). When such a puncture occurs, fuel may leak from the fuel tank, reducing the effective range of the vehicle and posing a fire hazard, among other detrimental effects.

Fuel tanks that are tolerant to penetration by projectile have been in use since the World War II era. Previous fuel tanks have incorporated various formulations of rubber to counteract the impact of a projectile against the fuel tank. When a projectile pierces the fuel tank wall, fuel escapes from the resulting hole in the fuel tank wall. The rubber swells when exposed to the fuel, thereby closing and sealing the hole in the fuel tank wall. The use of rubber as a protective layer against leakage has several drawbacks. For example, rubber-based sealing liners have a slow response time, which becomes progressively worse over time as the fuel tank ages. Another drawback is that if fuel leaks from an inside liner of the tank, which may occur in the case of a compromised liner, the rubber in the rubber sealing liner becomes prematurely activated. Once activated, the fuel tank is decommissioned. Another drawback of rubber sealing liners is that the rubber requires exposure to fuel or other aromatic substances in order to be activated and to swell. Thus, rubber sealing liners cannot be used in non-fuel applications, such as water tanks or water hoses. In addition, rubber is a relatively heavy product and adds an undesirable weight penalty in weight-sensitive applications, such as aerospace applications. Accordingly, a need has arisen for liquid leakage barriers that have a reduced weight penalty and an enhanced operating lifespan, while avoiding other drawbacks of existing self-sealing liquid barriers, including rubber-based sealing liners.

SUMMARY

An embodiment liquid containment cell includes an inner layer configured to contain a liquid, an outer layer, and a multilayer self-sealing structure disposed between the inner layer and the outer layer, where the multilayer self-sealing structure includes a plurality of sealing liner layers and further includes at least one slip layer disposed between adjacent sealing liner layers of the plurality of sealing liner layers. The at least one slip layer includes a polyethylene (PE) material, and the at least one slip layer is configured to permit at least one sealing liner layer of the plurality of sealing liner layers to move at least partially into a hole created by a projectile.

An embodiment aircraft includes a fuselage, a liquid containment cell configured to store a liquid, the liquid containment cell including an inner layer configured to contact the liquid, an outer layer, and a self-sealing structure disposed between the inner layer and the outer layer, the self-sealing structure including a plurality of sealing liner layers and further comprising a plurality of slip layers, where each sealing liner layer of the plurality of sealing liner layers is separated from an immediately next sealing liner layer of the plurality of sealing liner layers by at least one slip layer of the plurality of slip layers, where each slip layer of the plurality of slip layers includes a polyethylene (PE) material, and where each sealing liner layer of the plurality of sealing liner layers includes an elastomer material.

An embodiment method for sealing a liquid containment cell includes providing a liquid containment cell, the liquid containment cell, comprising a multilayer self-sealing structure around an inner layer of the liquid containment cell, the multilayer self-sealing structure including a plurality of sealing liner layers and further comprising a plurality of slip layers, where each sealing liner layer of the plurality of sealing liner layers is separated from an immediately next sealing liner layer of the plurality of sealing liner layers by at least one slip layer of the plurality of slip layers, where each slip layer of the plurality of slip layers includes a polyethylene (PE) material, and where each sealing liner layer of the plurality of sealing liner layers is formed from a material including an elastomer, receiving a projectile into at least the multilayer self-sealing structure, the projectile forming a hole through the plurality of sealing liner layers and through the inner layer, and sealing the hole by sliding at least one sealing liner layer of the plurality of sealing liner layers, with respect to the inner layer and with respect to another sealing liner layer of the plurality of sealing liner layers, the sliding causing the at least one sealing liner layers to fill at least a portion of the hole.

BRIEF DESCRIPTION OF THE DRAWINGS

For a more complete understanding of the present invention, and the advantages thereof, reference is now made to the following descriptions taken in conjunction with the accompanying drawings, in which:

FIGS. 5A through 5C illustrate fuel cells including a self-sealing structure, in accordance with some embodiments;

FIGS. 7A through 7C illustrate a rotorcraft including a self-sealing structure, in accordance with some embodiments;

FIGS. 9A through 9C illustrate a water tank and water hose including a self-sealing structure, in accordance with some embodiments;

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including by mere contact or by moving and/or non-moving mechanical connections.

Figure 1:
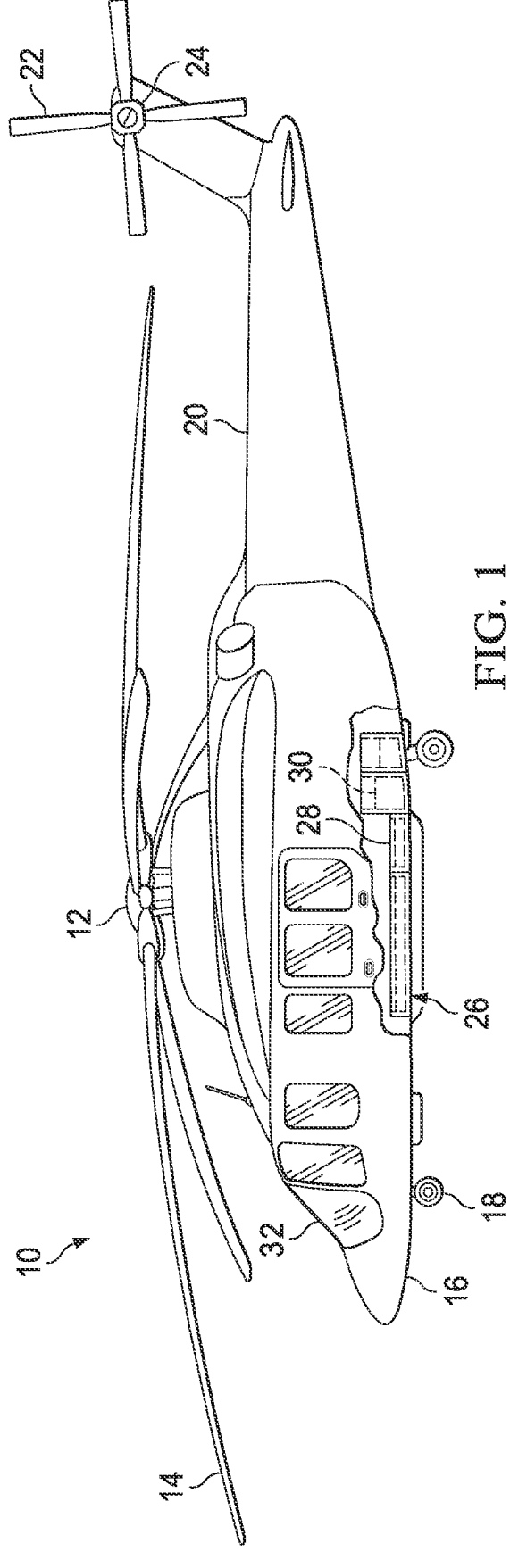
FIG. 1 illustrates a rotorcraft utilizing a self-sealing structure, in accordance with some embodiments.

FIG. 1 illustrates a rotorcraft 10, in accordance with some embodiments. The rotorcraft 10 includes a main rotor system 12, which includes a plurality of main rotor blades 14. The pitch of each of the main rotor blades 14 may be controlled by a swashplate in order to selectively control the attitude, altitude, and movement of the rotorcraft 10. The swashplate may be used to collectively and/or cyclically change the pitch of the main rotor blades 14. The rotorcraft 10 also includes an anti-torque system, which may include a tail rotor 24, a no-tail-rotor (NOTAR), or a dual main rotor system. In the embodiment illustrated in FIG. 1, the rotorcraft 10 includes the tail rotor 24. The pitch of each tail rotor blade 22 in the tail rotor 24 may be collectively changed in order to vary thrust of the anti-torque system, providing directional control of the rotorcraft 10. The pitch of the tail rotor blades 22 is changed by one or more tail rotor actuators. In some embodiments, a fly-by-wire (FBW) system sends electrical signals to the tail rotor actuators or main rotor actuators to control the flight of the rotorcraft 10.

Power is supplied to the main rotor system 12 and the anti-torque system by engines. There may be one or more engines, which may be controlled according to signals from the FBW system. The output of the engines is provided to a driveshaft, which is mechanically and operatively coupled to the main rotor system 12 and the anti-torque system through a main rotor transmission and a tail rotor transmission, respectively.

The rotorcraft 10 further includes a fuselage 16 and tail section 20. The tail section 20 may include other flight control devices such as horizontal or vertical stabilizers, rudder, elevators, or other control or stabilizing surfaces that are used to control or stabilize flight of the rotorcraft 10. A landing gear system 18 provides ground support for the rotorcraft 10, and may be included in the fuselage 16 and/or the tail section 20. The fuselage 16 includes a cockpit 32, which includes displays, controls, and instruments. It should be appreciated that even though rotorcraft 10 is depicted as having certain illustrated features, the rotorcraft 10 may include a variety of implementation-specific configurations. For instance, in some embodiments, the cockpit 32 is configured to accommodate a pilot and/or a co-pilot, as illustrated. In some embodiments, the rotorcraft 10 may be operated remotely. In embodiments in which the rotorcraft 10 may be operated remotely, the cockpit 32 may be configured as a fully functioning cockpit to accommodate a pilot and/or a co-pilot to provide for greater flexibility of use, or may be configured with a cockpit having limited functionality. For example, the cockpit 32 may include accommodations for only one person who would function as the pilot or co-pilot with a remote operator functioning as a remote pilot, a remote co-pilot, or a back-up pilot. In some embodiments, the rotorcraft 10 may be configured as an unmanned vehicle, in which case the cockpit 32 may be eliminated entirely in order to save space and cost.

The rotorcraft 10 includes a fuel system 26, including a fuel tank 28 located in a lower portion of the fuselage 16. The fuel tank 28 is coupled to the fuselage 16 and may be fully or partially integrated with the fuselage 16. The fuel tank 28 may be independent from, but secured to the fuselage 16. In some embodiments, the fuel tank 28 may be located elsewhere in the rotorcraft 10. The fuel tank 28 includes one or more fuel cells 30, such as flexible fuel bags or rigid fuel cells, each of which contains fuel. The fuel cells 30 may be interconnected by hoses. The fuel contained in the fuel cells 30 is used as an energy source to power the various systems of the rotorcraft 10, such as main rotor system 12 and the tail rotor 24. The various components of the fuel system 26 are at risk of being pierced by projectiles and the like. For example, in military applications, the fuel system 26 is susceptible to being punctured by incoming enemy fire, such as bullet rounds and shrapnel. When components of the fuel system 26 are punctured, fuel may leak from the fuel system 26, which may reduce the effective range of the rotorcraft 10 and pose a fire or explosion hazard, among other detrimental effects.

Previous fuel cells have incorporated various formulations of rubber to counteract the impact of projectiles against the fuel cell. When a projectile pierces the fuel cell wall, fuel escapes from the resulting hole in the fuel cell wall. The rubber swells when exposed to the fuel, thereby closing and sealing the hole in the fuel cell wall. However, the use of rubber as a protective layer against leakage has several drawbacks. For example, rubber-based sealing liners have a slow response time, which becomes progressively worse as the fuel cell ages. Fuel may permeate from an inside liner of the fuel cell, to the rubber layer(s), thereby causing the rubber in the rubber-based sealing liners to be prematurely activated. Once the rubber-based sealing liners are activated, the fuel cell is decommissioned. Rubber-based sealing liners can have reduced effectiveness in low-temperature conditions because of the slowed reaction between the cold rubber and fuel source. Further, the rubber-based sealing liners require exposure to fuel or other aromatic substances in order to be activated and to swell. Thus, the rubber-based sealing liners cannot be used in non-fuel applications, such as water tanks or water hoses. In addition, rubber is a relatively heavy product and adds an undesirable weight penalty when used on aircraft.

To address these and other drawbacks of rubber-based sealing liners, the disclosed embodiments include a self-sealing textile structure that is attached on or within one or more walls of a liquid enclosure. The self-sealing textile structure self-seals holes formed in the enclosure, such as by projectiles, thereby reducing leakage of the liquid from the enclosure. In the disclosed embodiments, the self-sealing textile structure may be positioned on or within one or more walls of the fuel cells 30, fuel hoses interconnecting the fuel cells 30, and any other desired components of the fuel system 26. When a wall of a component of the fuel system 26 that includes the self-sealing textile structure is pierced by a projectile or other object, a hole is formed in the wall. The projectile is caught by the self-sealing textile structure. As the projectile passes through inner layers of the wall and extends the hole, the projectile pulls the self-sealing textile structure through the hole, and the self-sealing textile structure seals the hole. The self-sealing textile structure may include a high strength material, such as ultra-high molecular weight polyethylene (UHMWPE), poly(p-phenylene-2, 6-benzobisoxazole) (PBO), poly(azanediyl-1,4-phenylenea-zanediylterephthaloyl) (poly-aramid), combinations thereof, or the like, and may be wrapped loosely around an inner layer of the component wall. This allows the self-sealing textile structure to catch the projectile and move with the projectile into the hole, pulling excess material of the self-sealing textile structure into the hole and plugging the hole.

Unlike rubber-based sealing liners, the self-sealing textile structure of the disclosed embodiments does not require contact with fuel or other aromatics to be triggered or activated, leading to several benefits. For example, the self-sealing textile structure may be used across a wider range of liquid containers. The self-sealing textile structure may be used to protect against the leakage of any non-solid substance, including any gas or liquid. For example, the self-sealing textile structure may be used in the walls of a water tank to prevent the leakage of water therefrom. The self-sealing textile structure is not prone to premature activation, which may occur in rubber-based sealing liners when fuel leaks through the innermost layer of the walls of components of the fuel system 26. The physical mechanism by which the self-sealing textile structure seals holes is not impacted by temperature, and the self-sealing textile structure can be used in low-temperature conditions. The self-sealing textile structure is also effective at lower weights than previous rubber counterparts, allowing the self-sealing textile structure to be used in weight-sensitive applications, such as aerospace applications. The self-sealing textile structure is compatible with additively manufactured liquid enclosures and tanks, such as additively manufactured fuel tanks. Compared to rubber-based sealing liners, the self-sealing textile structure has performance characteristics that do not degrade over the useful life of the enclosures, cells, bladders, containers, or tanks in which they are used.

It should be appreciated that the rotorcraft 10 is merely illustrative of a variety of aircraft that can implement the embodiments disclosed herein. The self-sealing textile structures of the disclosed embodiments may be implemented on any aircraft. Other aircraft to which the self-sealing textile structures may be applied include hybrid aircraft, tiltwing aircraft, tiltrotor aircraft, quad tiltrotor aircraft, unmanned aircraft, gyrocopters, propeller-driven airplanes, compound helicopters, jets, drones, and the like. Those skilled in the art will recognize that the self-sealing textile structures of the disclosed embodiments can be integrated into a variety of aircraft configurations. It should be appreciated that even though aircraft are well-suited to implement the embodiments of the present disclosure, non-aircraft vehicles, including ground vehicles as well as devices such as water tanks, standalone fuel tanks, water hoses and non-enclosure panels, can also incorporate the disclosed self-sealing textile structures.

Figure 2A:
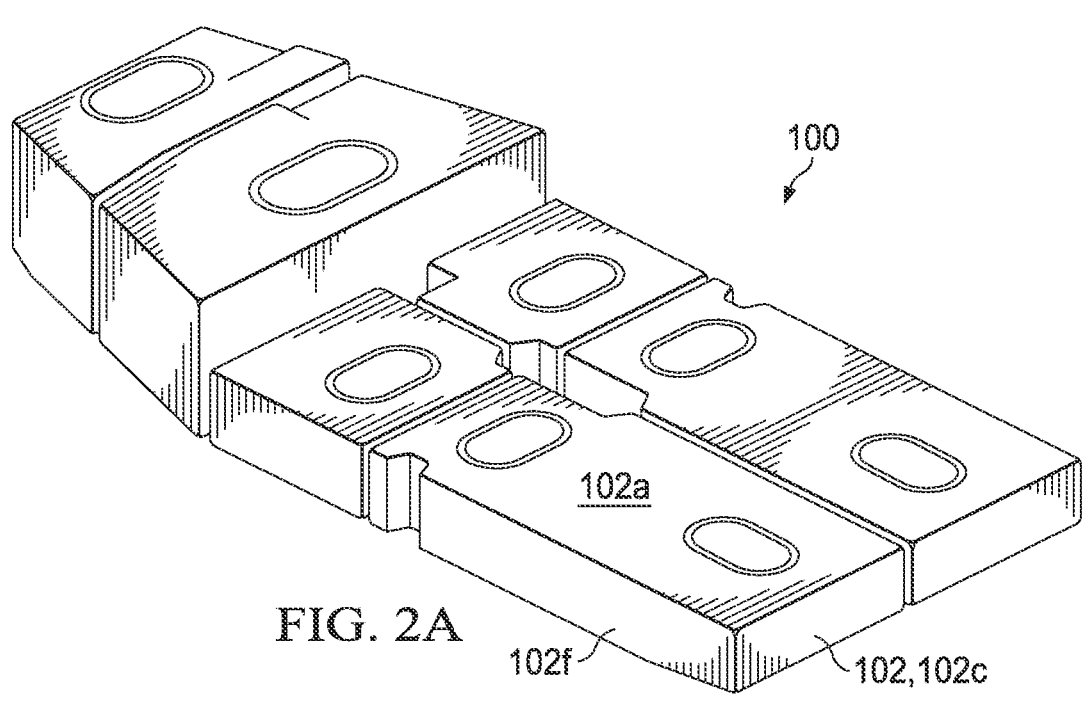
FIGS. 2A through 2C illustrate fuel cells including a self-sealing structure, in accordance with some embodiments.
Figure 2B:
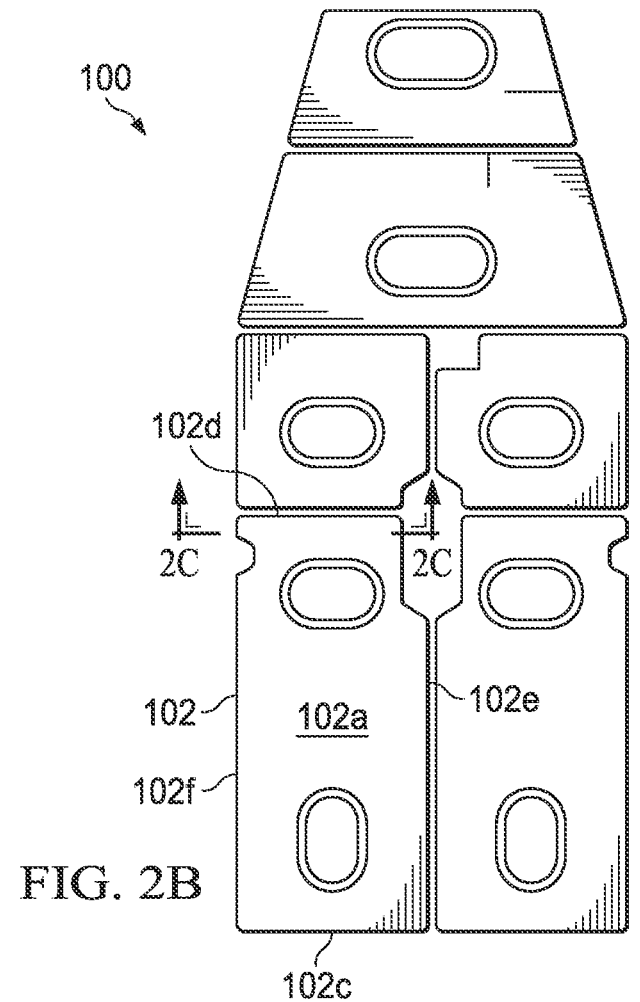
Figure 2C:
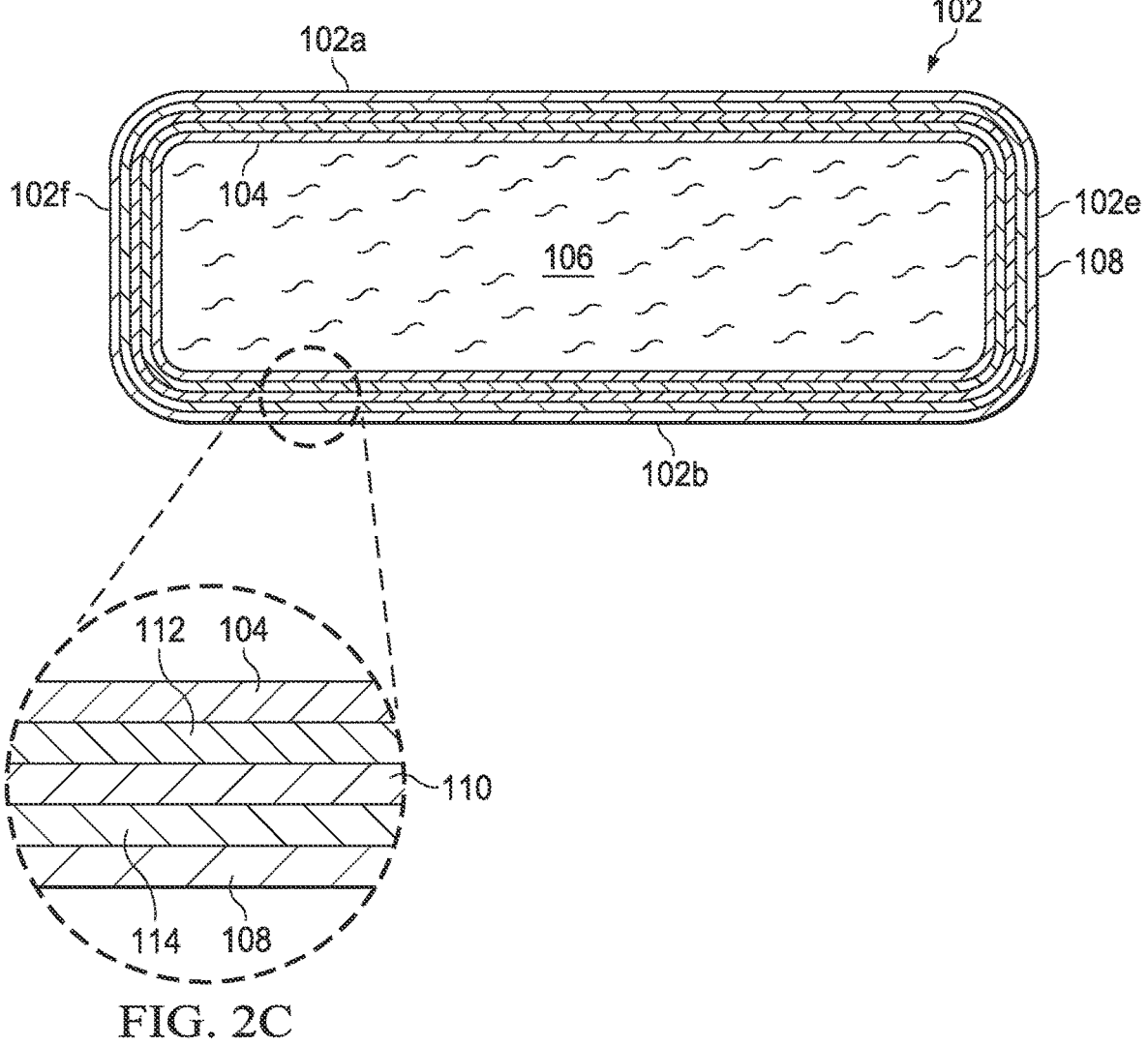

FIGS. 2A through 2C illustrate a fuel tank boo and components thereof for a rotorcraft, such as the rotorcraft 10 illustrated in FIG. 1. The fuel tank 100 may include various fuel cells 102, which are fluidly coupled to one another and allow for the transfer of fuel or gas there between. FIG. 2C illustrates a cross-sectional view of one of the fuel cells 102. The fuel cell 102 illustrated in FIG. 2C is substantially similar to other fuel cells 102 of the fuel tank 100. Therefore, for sake of efficiency, certain features will be disclosed only with regard to the fuel cell 102 illustrated in FIG. 2C.

As illustrated in FIGS. 2A through 2C, the fuel cells 102 are formed from a plurality of walls including a top wall 102a, a bottom wall 102b, a forward wall 102C, an aft wall 102d, a port wall 102e and a starboard wall 102f. Each of the fuel cells 102 may include any number of curved or straight walls, each facing any desired direction. In FIG. 2C, the fuel cell 102 includes an inner layer 104. The inner layer 104 may be in contact with fuel or another liquid contained in the fuel cell 102. The inner layer 104 defines an internal fluid reservoir, which contains a fuel 106. As such, the inner layer 104 may be formed of a fuel-resistant or fuel-tolerant material. The inner layer 104 may be formed from various materials that are suitable for containing fuel 106. In some embodiments, the inner layer 104 may be formed from one or more materials that are resistant to being pierced. For example, the inner layer 104 may be made from metallic or metallic alloy materials that are resistant to impact from projectiles, such as military projectiles. The inner layer 104 may be made from composites, carbon-based materials, polymeric materials, or the like. In some embodiments, the inner layer 104 may be formed of polyvinylidene fluoride (PVDF), nylon, urethane, combinations or multiple layers thereof, or the like.

The fuel cell 102 includes an outer layer 108 that defines an outer surface of the fuel cell 102. In some embodiments, the outer layer 108 may be a moderate fuel barrier, and may prevent fuel from outside the fuel cell 102 from penetrating the walls of the fuel cell 102. The outer layer 108 may be made from various materials that are suitable for forming an outer surface of the fuel cell 102. In some embodiments, the outer layer 108 may be formed from one or more materials that are resistant to being pierced. For example, the outer layer 108 may be formed from metallic or metallic alloy materials that are resistant to impact from projectiles, such as military projectiles. The outer layer 108 may be made from composites, carbon-based materials, polymeric materials, or the like. Other suitable materials for both the inner layer 104 and the outer layer 108 may also be employed. In some embodiments, the inner layer 104 and the outer layer 108, as well as other layers of the fuel cell 102 may be flexible layers. As such, the fuel cell 102 may be a flexible fuel bag or bladder. In some embodiments, the inner layer 104 and the outer layer 108 may be rigid layers, such as metallic layers, such that fuel cell 102 forms a rigid fuel tank.

The fuel cell 102 includes a self-sealing textile structure 110 interposed between the inner layer 104 and the outer layer 108. An inner intermediate layer 112 is interposed between the inner layer 104 and the self-sealing textile structure 110 and an outer intermediate layer 114 is interposed between the outer layer 108 and the self-sealing textile structure 110. Either or both of the inner intermediate layer 112 and the outer intermediate layer 114 may include one or more textile or textile layers, which may be used to provide strength and/or structure for the fuel cell 102. Either or both of the inner intermediate layer 112 and the outer intermediate layer 114 may additionally or alternatively include other substances or layers, such as PVDF, PVDF having carbon black fibers for electrostatic protection, an elastomer (such as a polyurea elastomer, e.g., a LINE-X material, a DRAGONSHIELD-HT material, or the like), an adhesive, a tie-coat, a elastomer sealant (such as natural or synthetic rubber for ballistic protection), combinations or multiple layers thereof, or any other suitable materials. In some embodiments, the inner intermediate layer 112 and/or the outer intermediate layer 114 may include nylon, such as HT-nylon. The inner intermediate layer 112 and the outer intermediate layer 114 may be optional and may be omitted in some embodiments. In embodiments in which the inner intermediate layer 112 and the outer intermediate layer 114 are omitted, the self-sealing textile structure 110 may substantially fill the volume defined between the inner layer 104 and the outer layer 108.

In the embodiment of FIGS. 2A through 2C, the self-sealing textile structure 110 is interposed between the inner layer 104 and the outer layer 108 on all of the walls 102a-102f of the fuel cell 102. However, the self-sealing textile structure 110 may be included in less than all of the walls 102a-102f of the fuel cell 102. For example, in some embodiments, the self-sealing textile structure 110 may only be included on the bottom wall 102b of the fuel cell 102; on the bottom wall 102b and partially up the forward wall 102C, the aft wall 102d, the port wall 102e, and the starboard wall 102f of the fuel cell 102; on any individual ones of the top wall 102a, the bottom wall 102b, the forward wall 102C, the aft wall 102d, the port wall 102e, and the starboard wall 102f; or the like. The self-sealing textile structure 110 may be included in the walls 102a-102f of the fuel cell 102 based on where the fuel cell 102 is located on the rotorcraft 10 and where the fuel cell 102 is most likely to be struck by projectiles and the like.

The material of the self-sealing textile structure 110 may be selected from various textile structures having high strength-to-weight ratios. In some embodiments, the self-sealing textile structure 110 may be formed of an ultra-high molecular weight polyethylene (UHMWPE) textile (e.g., Spectra textile structures, Dyneema textile structures, or the like), poly(p-phenylene-2,6-benzobisoxazole) (PBO, e.g., Zylon or the like), poly(azanediyl-1,4-phenyleneazanediyl-terephthaloyl) (para-aramid, e.g., Kevlar or the like), combinations thereof, or the like. In some embodiments, the self-sealing textile structure 110 may be formed of other textile structures having good resistance to materials to be enclosed in the fuel cell 102, high yield strengths (e.g., yield strengths ranging from about 0.15 GPa to about 0.90 GPa, or from about 0.30 GPa to about 0.075 GPa), and low densities. The self-sealing textile structure 110 may be formed of a textile material that is formulated to resist penetration by a projectile that penetrates the fuel cell 102. The material of the self-sealing textile structure 110 may be leakproof with respect to liquids or gases that are contained within the fuel cell 102 (e.g., watertight, airtight, fuel-tight, etc.).

The self-sealing textile structure 110 may be formed of a number of layers of textile that are loosely contained between the inner layer 104 and the outer layer 108. In some embodiments, the self-sealing textile structure 110 may have a thickness dependent on the size of an anticipated projectile, and may, for example have a range from about 0.100 inches to about 0.400 inches for small arms fire, such as 0.50 caliber projectiles, and may have a range from about 0.250 inches to about 1.250 inches for larger caliber projectiles such as 20 mm and 30 mm projectiles. The self-sealing textile structure 110 may be formed by stacking layers of a self-sealing textile. In some embodiments, the self-sealing textile structure 110 may include from 10 layers of self-sealing textile to 45 layers of self-sealing textile. Each layer of the self-sealing textile may have a thickness ranging from about 0.006 inches to about 0.009 inches. In some embodiments, each layer of self-sealing textile forming the self-sealing textile structure 110 may be formed from one or more sub-layers, such as two to three sub-layers, each having a thickness of about 0.003 inches. Forming the self-sealing textile structure 110 with a thickness greater than the prescribed range may add unnecessary weight to the fuel cell 102 and may undesirably increase the size of the fuel cell 102; while forming the self-sealing textile structure 110 with a thickness less than the prescribed range may be insufficient to capture projectiles and seal holes formed in the fuel cell 102. Although the self-sealing textile structure 110 is illustrated in FIG. 2C as filling the space between the inner intermediate layer 112 and the outer intermediate layer 114, at least portions of the self-sealing textile structure 110 may be separated from the inner intermediate layer 112 and/or the outer intermediate layer 114 by a gap, which may be filled by air or the like. This provides space for excess material of the self-sealing textile structure no and space for the self-sealing textile structure 110 to move when the fuel cell is penetrated by a projectile.

In some embodiments, the self-sealing textile structure 110 may have a thickness equal to a thickness of the rubber-based sealing liners. In some embodiments, the self-sealing textile structure 110 may be formed of a material having a density ranging from about 0.97 g/cm$^3$ to about 1.56 g/cm$^3$. However, because the layers of the self-sealing textile are loosely stacked in the self-sealing textile structure 110, the self-sealing textile structure 110 may have a density as low as about 22% of the density of the conventional rubber material. As such, the self-sealing textile structure 110 may have a density ranging from about 0.20 g/cm$^3$ to about 0.50 g/cm$^3$ or from about 0.2 g/cm$^3$ to about 0.97 g/cm$^3$. The self-sealing textile structure no may have a density that is about half a density of rubber-based sealing liners. Because the rubber-based sealing liners make up about 40% of the weight of conventional tanks, replacing the rubber-based sealing liners with the self-sealing textile structure may reduce the weight of the fuel cell 102 by about 20%. In some embodiments, the self-sealing textile structure 110 may have a thickness less than the thickness of the rubber-based sealing liners, such that the weight of the fuel cell 102 may be further reduced.

The self-sealing textile structure 110 is formulated to self-seal, or self-heal, a hole therein, such as a hole formed by a projectile or the like. This reduces the leakage of the fuel 106 from the fuel cell 102 when the fuel cell 102 is penetrated. The self-sealing textile structure 110 does not require water, fuel or aromatics to be activated or triggered to expand to fill the hole formed in the fuel cell 102. As such, the self-sealing textile structure 110 may be formed of materials that are not reactive with substances to be stored in the fuel cell 102. Further, the self-sealing textile structure 110 may be formed of materials that are more flexible than conventional rubber used in rubber-based sealing liners. This is particularly beneficial when the fuel cell 102 is a flexible structure, such as a flexible fuel bag.

The self-sealing textile structure 110 may be formed in the fuel cell 102 by providing a structure including the inner layer 104 and the inner intermediate layer 112. The self-sealing textile layers of the self-sealing textile structure 110 are loosely wrapped around the inner intermediate layer 112. Each layer of the self-sealing textile in the self-sealing textile structure 110 may, in some embodiments, include excess textile ranging from about 100% to about 400% of the area of the inner intermediate layer 112 and/or the inner layer 104 to be contained, and in other embodiments, may include excess textile ranging from about 110% to about 150% of the area of the inner intermediate layer 112 and/or the inner layer 104 to be contained. In some embodiments, the self-sealing textile may be sized to include an overlap seam ranging from about 5 mm to about 50 mm for each wall of the fuel cell 102 to be covered. This provides sufficient material of the self-sealing textile to catch and move with a projectile and to seal a hole formed by the projectile, without adding unnecessary weight to the fuel cell 102. The layers of the self-sealing textile are loosely adhered to the inner intermediate layer 112 such that underlying layers of the self-sealing textile do not move while the self-sealing textile structure no is formed. The layers of the self-sealing textile are adhered to the inner intermediate layers 112 by an adhesive configured to allow the layers of the self-sealing textile to move when the completed fuel cell 102 is struck by a projectile. The layers of the self-sealing textile may be wrapped around and adhered to the inner intermediate layers 112 by hand, by mechanical means, or the like. Once the layers of the self-sealing textile reach a sufficient thickness, the outer intermediate layer 114 and the outer layer 108 are formed over the self-sealing textile structure 110.

The self-sealing textile structure 110 may be configured to protect the fuel cell 102 from specific threats, such as specific calibers of bullets and the like, based on the thickness of the self-sealing textile structure 110, the number of layers of the self-sealing textile included in the self-sealing textile structure 110, how tight the self-sealing textile structure 110 is wrapped around the inner intermediate layers 112, how much extra textile is included in each layer of the self-sealing textile, and the like. The structure of the self-sealing textile structure 110 may further be altered based on whether the fuel cell 102 is designed to be pressurized, and based on what pressure the fuel cell 102 is designed to be operated at. For example, in some embodiments, 17 layers of the self-sealing textile may be included in the self-sealing textile structure 110 to protect an un-pressurized fuel cell 102 against a 0.50 caliber projectile, while 30 layers of the self-sealing textile may be included in the self-sealing textile structure 110 to protect a pressurized fuel cell 102 against a 0.50 caliber projectile. Providing the self-sealing textile structure 110 with a greater density increases the amount of energy that may be absorbed by the self-sealing textile structure 110, and may be useful for higher operating pressures in the fuel cell 102. Providing the self-sealing textile structure 110 with a lower density provides for greater projectile capturing ability and reduces the weight of the self-sealing textile structure 110. In an embodiment in which the self-sealing textile structure 110 is intended to provide defense again projectiles having a diameter of less than about 9 mm, the self-sealing textile structure 110 may have a yield strength ranging from about 0.20 GPa to about 0.80 GPa, include from 6 to 33 layers of the self-sealing textile, have a material thickness ranging from about 0.05 inches to about 0.3 inches (e.g., the material of the self-sealing textile in the self-sealing textile structure 110 may have a thickness ranging from about 0.05 inches to about 0.3 inches, but may fill a 0.4 inch space between the inner intermediate layers 112 and the outer intermediate layers 114), and may have a density ranging from about 0.2 g/cm$^3$ to about 0.97 g/cm$^3$. In an embodiment in which the self-sealing textile structure 110 is intended to provide defense again projectiles having a diameter of less than about 12 mm, the self-sealing textile structure 110 may have a yield strength ranging from about 0.25 GPa to about 0.75 GPa, include from 11 to 56 layers of the self-sealing textile, have a material thickness ranging from about 0.1 inches to about 0.5 inches, and may have a density ranging from about 0.2 g/cm$^3$ to about 0.97 g/cm$^3$. In an embodiment in which the self-sealing textile structure 110 is intended to provide defense again projectiles having a diameter of ranging from about 12 mm to about 15 mm, the self-sealing textile structure 110 may have a yield strength ranging from about 0.20 GPa to about 0.90 GPa, include from 17 to 83 layers of the self-sealing textile, have a material thickness ranging from about 0.15 inches to about 0.75 inches, and may have a density ranging from about 0.2 g/cm$^3$ to about 0.97 g/cm$^3$. In an embodiment in which the self-sealing textile structure 110 is intended to provide defense again projectiles having a diameter of greater than about 15 mm, the self-sealing textile structure 110 may have a yield strength ranging from about 0.30 GPa to about 1.00 GPa, include from 22 to 111 layers of the self-sealing textile, have a material thickness ranging from about 0.2 inches to about 1 inch, and may have a density ranging from about 0.2 g/cm$^3$ to about 0.97 g/cm$^3$.

Figure 3A:
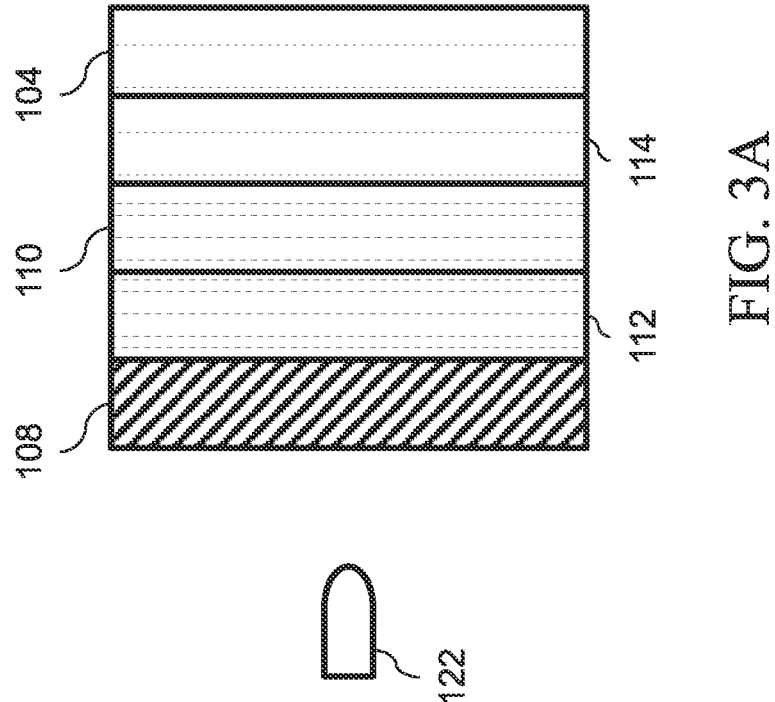
FIGS. 3A and 3B illustrate a portion of a wall of a fuel cell before and after the wall is struck by a projectile, in accordance with some embodiments.
Figure 3B:
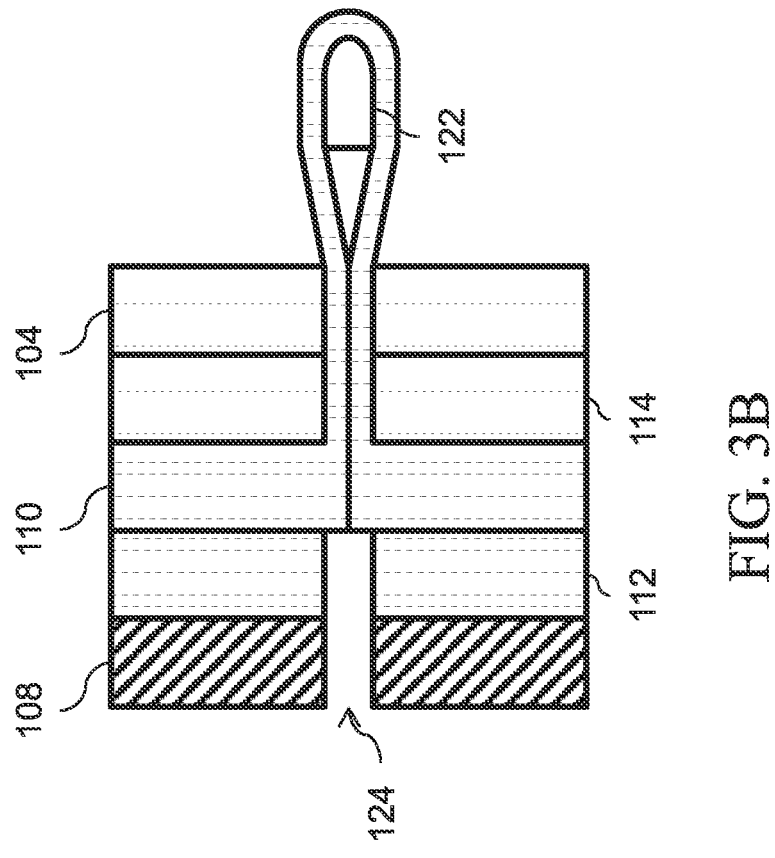

FIGS. 3A and 3B illustrate cross-sectional views of a portion of a wall of the fuel cell 102 before and after the wall is struck by a projectile 122, respectively. As illustrated in FIG. 3B, a hole 124 is formed extending through the outer layer 108 and the outer intermediate layer 114. The projectile 122 is caught in the self-sealing textile structure 110 and the self-sealing textile structure 110 and the projectile 122 continue to penetrate through the inner intermediate layer 112 and the inner layer 104. In some embodiments, the material of the self-sealing textile structure 110 that surrounds the projectile 122 may cause the diameter of the hole 124 to become larger in the inner intermediate layer 112 and the inner layer 104 compared to the outer intermediate layer 114 and the outer layer 108.

The layers of the self-sealing textile structure 110 may be wrapped loosely around the inner intermediate layer 112 and/or the inner layer 104 such that the self-sealing textile structure no110 includes excess material. As illustrated in FIG. 3B, the excess material of the self-sealing textile structure 110 allows for material of the self-sealing textile structure 110 to be pulled into the interior of the fuel cell 102 and the excess material pulled through the hole 124 seals the hole 124. In some cases, energy from the projectile 122 may continue through the fuel cell 102 and may also damage a wall of the fuel cell 102 opposite the wall struck by the projectile 122 in the direction in which the projectile 122 is traveling. This phenomenon is known as hydrodynamic ram (HRAM). The HRAM may damage the wall of the fuel cell 102 opposite the wall struck by the projectile 122, such as any of the inner layer 104, the inner intermediate layer 112, the outer intermediate layer 114, and/or the outer layer 108. However, the self-sealing textile structure 110 may simply bulge when impacted by the HRAM, preventing fuel leaks from the wall of the fuel cell 102 opposite the wall struck by the projectile 122 in addition to the wall struck by the projectile 122.

Because the sealing action is physical, rather than chemical, as in rubber-based sealing liners, the hole 124 is immediately sealed. The physical sealing action does not require activation by the liquid contained in an enclosure such that the self-sealing textile structure no can be used in any type of liquid enclosure, regardless of the liquid to be contained in the enclosure. The material of the self-sealing textile structure 110 is not activated by the liquid contained in an enclosure, which prevents the self-sealing textile structure 110 from degrading or being prematurely activated, even in cases in which the inner intermediate layer 112 and/or the inner layer 104 are compromised. The self-sealing textile structure 110 has a density of about half the density of rubber-based sealing liners, which reduces the weight of fuel cells 102 to which the self-sealing textile structure 110 is applied by approximately 20%.

In some embodiments, the self-sealing textile structure 110 may be repairable after the fuel cell 102 is penetrated by a projectile. For example, the self-sealing textile structure 110 may be removed from the fuel cell 102, any portion of the self-sealing textile structure 110 may be removed and patched or otherwise replaced, and the self-sealing textile structure 110 may be re-installed on the fuel cell 102. Conventional rubber-based sealing liners are activated and become inoperable upon exposure to fuel. In contrast, the self-sealing textile structure no physically seals punctures in the fuel cell 102 and is not negatively impacted by exposure to fuel, which allows for the self-sealing textile structure 110 to seal multiple punctures in close proximity to one another, and for the self-sealing textile structure 110 to be repairable.

Figures 4A, 4B, 4C:
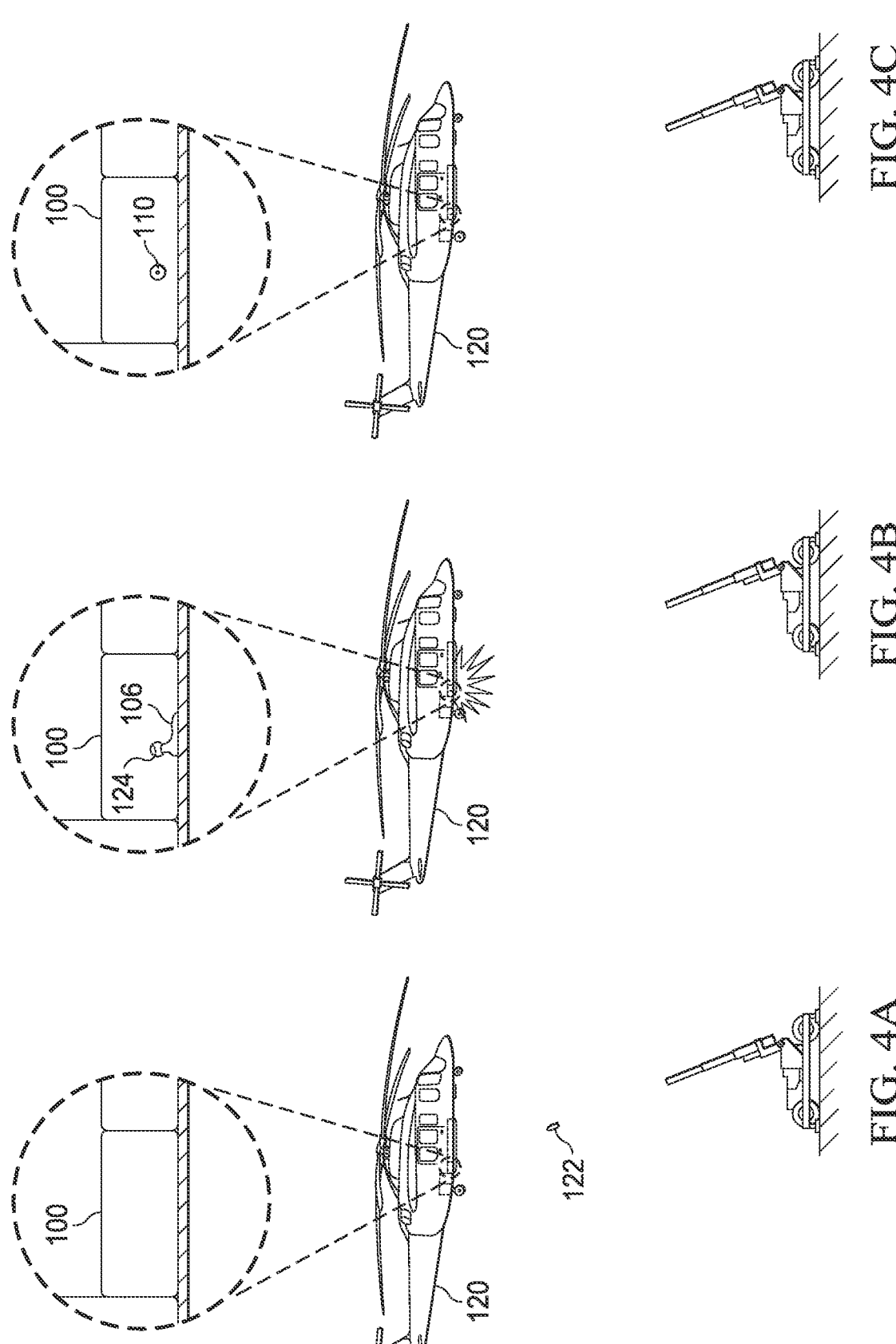
FIGS. 4A through 4C illustrate a rotorcraft including a self-sealing structure being struck by a projectile, in accordance with some embodiments.

FIGS. 4A through 4C illustrate an operating scenario for a rotorcraft 120, which utilizes the self-sealing textile structure 110. In FIG. 4A, a projectile 122 has been fired at the rotorcraft 120. Even when the inner layer 104 and the outer layer 108 are formed from materials that are resistant to being pierced, foreign objects such as the projectile 122 may pierce through the outer layer 108 and subsequently through the inner layer 104, leaving a hole 124. The hole 124 allows fuel 106 to leak out of a fuel cell 102 of the fuel tank 100, as illustrated in FIG. 4B. As illustrated in FIG. 4C, the self-sealing textile structure 110 is configured to quickly seal the hole 124. As described previously, the self-sealing textile structure 110 is configured to immediately seal the hole 124 physically by being pulled through the hole 124 into the fuel cell 102. The self-sealing textile structure 110 may be configured to protect against specific threats. For example, the number of layers, tightness of packing, and the like of the self-sealing textile structure 110 may be selected to guard against specific threats, such as a .50 caliber round, a 14.7 mm round, a 20 mm round, or the like.

FIGS. 5A through 5C illustrate a fuel tank 200 for a rotorcraft, such as the rotorcraft 10 illustrated in FIGS. 1A through 1B. Self-sealing textile patches 202, 204, 206, and 208 are selectively included in only a portion of the side walls of fuel cells in the fuel tank 200. More particularly, a self-sealing textile patch 202 is included on the starboard side of a fuel cell 210, a self-sealing textile patch 208 is included on the forward side of a fuel cell 212 and a self-sealing textile patch 204 and a self-sealing textile patch 206 are included on the starboard and forward sides of a fuel cell 214, respectively. Other self-sealing textile patches may also be included on the fuel cells of the fuel tank 200, such as self-sealing textile patches on the port or bottom sides of the fuel cells. Whether all or a portion of the sides of each of the fuel cells of the fuel tank 200 includes the self-sealing textile patches may depend on military specifications. For example, military specifications may require that fuel cells have a high protection level, in which case all sides of each of the fuel cells may include the self-sealing textile structure 110, as illustrated for the fuel cell 102 in FIG. 2C. In the embodiment illustrated in FIGS. 5A through 5C, only portions of the selected fuel cell sides include the self-sealing textile, resulting in a lower level of protection, which may be sufficient for certain low protection military specifications.

FIG. 5C illustrates a self-sealing textile patch 204 on the starboard side of fuel cell 214, which is representative of the other self-sealing textile patches included in the fuel cells of the fuel tank 200. The self-sealing textile patch 204 is positioned in a portion of the volume between an outer layer 216 and an inner layer 218. While the self-sealing textile patch 204 is not illustrated as extending from the top to the bottom sides of the fuel cell 214, in some embodiments, the self-sealing textile patch 204 may extend the entire length between the top and bottom sides of the fuel cell 214. In some embodiments, an outer intermediate layer 220 and an inner intermediate layer 222 may be included on either or both sides of the self-sealing textile patch 204. In some embodiments, the materials and properties of the outer layer 216 of the fuel cells of the fuel tank 200 are regulated and/or subject to rigorous specifications. However, in some embodiments, the self-sealing textile patches may be coupled to the exterior side of the outer layer 216 on any of fuel cells of the fuel tank 200. Such exterior self-sealing textile patches may be coupled to the outer layer 216 in any manner such as by using an adhesive. In some embodiments, the self-sealing textile patches 202, 204, 206, and 208 as well as any exterior self-sealing textile patches may include an outer film or pouch in which the self-sealing textile is held.

Figure 6:
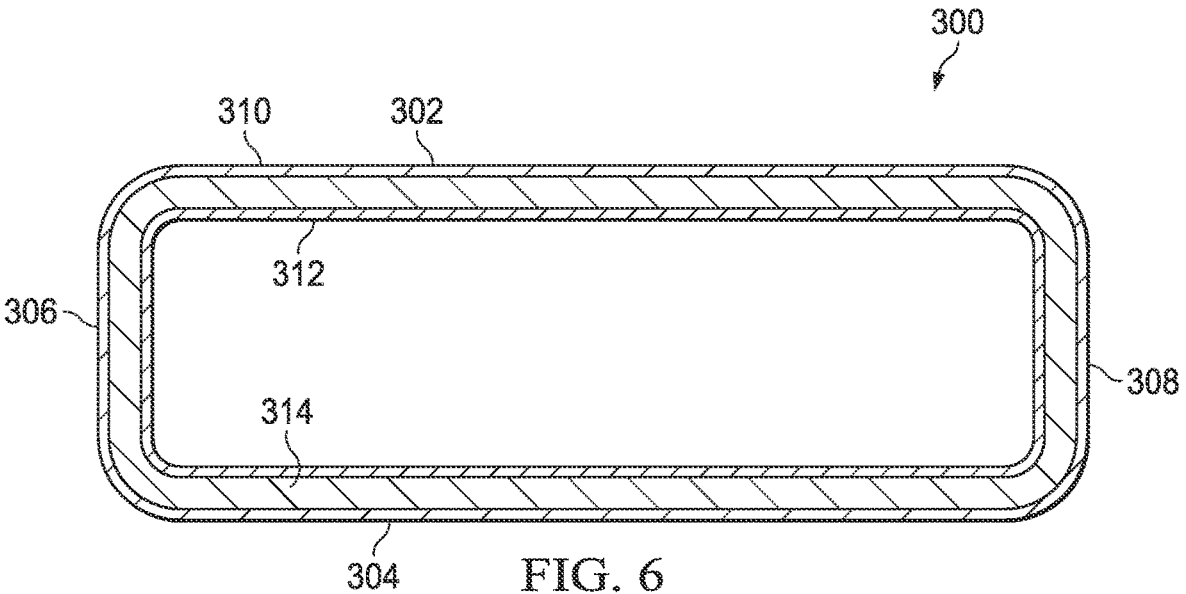
FIG. 6 illustrate a fuel cell including a self-sealing structure, in accordance with some embodiments.

FIG. 6 illustrates a fuel cell 300 utilizing a self-sealing textile structure 314. The fuel cell 300 may be a fuel cell for an aircraft, a ground vehicle, or any other machine or device requiring fuel. The fuel cell 300 has a top wall 302, a bottom wall 304 and peripheral walls 306 and 308. All of the walls of the fuel cell 300 include an outer layer 310 and an inner layer 312. The self-sealing textile structure 314 is interposed between the outer layer 310 and the inner layer 312 on all the walls 302, 304, 306, and 308 of the fuel cell 300. The fuel cell 300 does not include any intermediate layers, such that the self-sealing textile structure 314 fills the entire volume defined between the outer layer 310 and the inner layer 312. In some embodiments, the self-sealing textile structure 314 may be included in only a portion of the walls 302, 304, 306, and 308 of the fuel cell 300, and a different substance or no substance at all may be between the outer layer 310 and the inner layer 312 where the self-sealing textile structure 314 is absent.

FIGS. 7A through 7C illustrate a rotorcraft 400, which utilizes the self-sealing textile structures. The rotorcraft 400 is depicted as a helicopter. The rotorcraft includes a main rotor system 402, which includes a plurality of main rotor blades 404. The main rotor system 402 is rotatable relative to a fuselage 406 of the rotorcraft 400. The pitch of the main rotor blades 404 can be collectively and/or cyclically manipulated to selectively control direction, thrust and lift of the rotorcraft 400. A landing gear system 408 provides ground support for the rotorcraft 400. A tail section 410 extends from the fuselage 406. A tail rotor 414 includes a plurality of tail rotor blades 412 and is rotatably coupled to the aft portion of the tail section 410. The main rotor system 402 is powered by an engine 416 via a main rotor gearbox 418. A mast 420 extends through a top case 422.

The main rotor gearbox 418 contains gears and lubricant. In the event that a hole is formed in the main rotor gearbox 418, lubricant may leak from the main rotor gearbox 418, subjecting the gears therein to damage. FIG. 7C illustrates a cross-sectional view of a wall of the main rotor gearbox 418, including a self-sealing textile structure 424. The self-sealing textile structure 424 is surrounded by an outer wall 426 and an inner wall 428. In some embodiments, the main rotor gearbox 418 may include only a single wall. In some embodiments, the main rotor gearbox 418 may be protected from projectiles by one or more self-sealing textile patches 430, in addition to or in place of the self-sealing textile structure 424 on the inside of the outer wall 426. The self-sealing textile patches 430 may be adhered on any portion of the main rotor gearbox 418 that is susceptible to damage by incoming projectiles. In some embodiments, the self-sealing textile may cover or be included on all walls of the main rotor gearbox 418. The inclusion of the self-sealing textile structure 424 and the self-sealing textile patches 430 on the main rotor gearbox 418 is a non-limiting example of the wide variety of applications for which the self-sealing textile of the disclosed embodiments may be used.

Figures 8A, 8B:
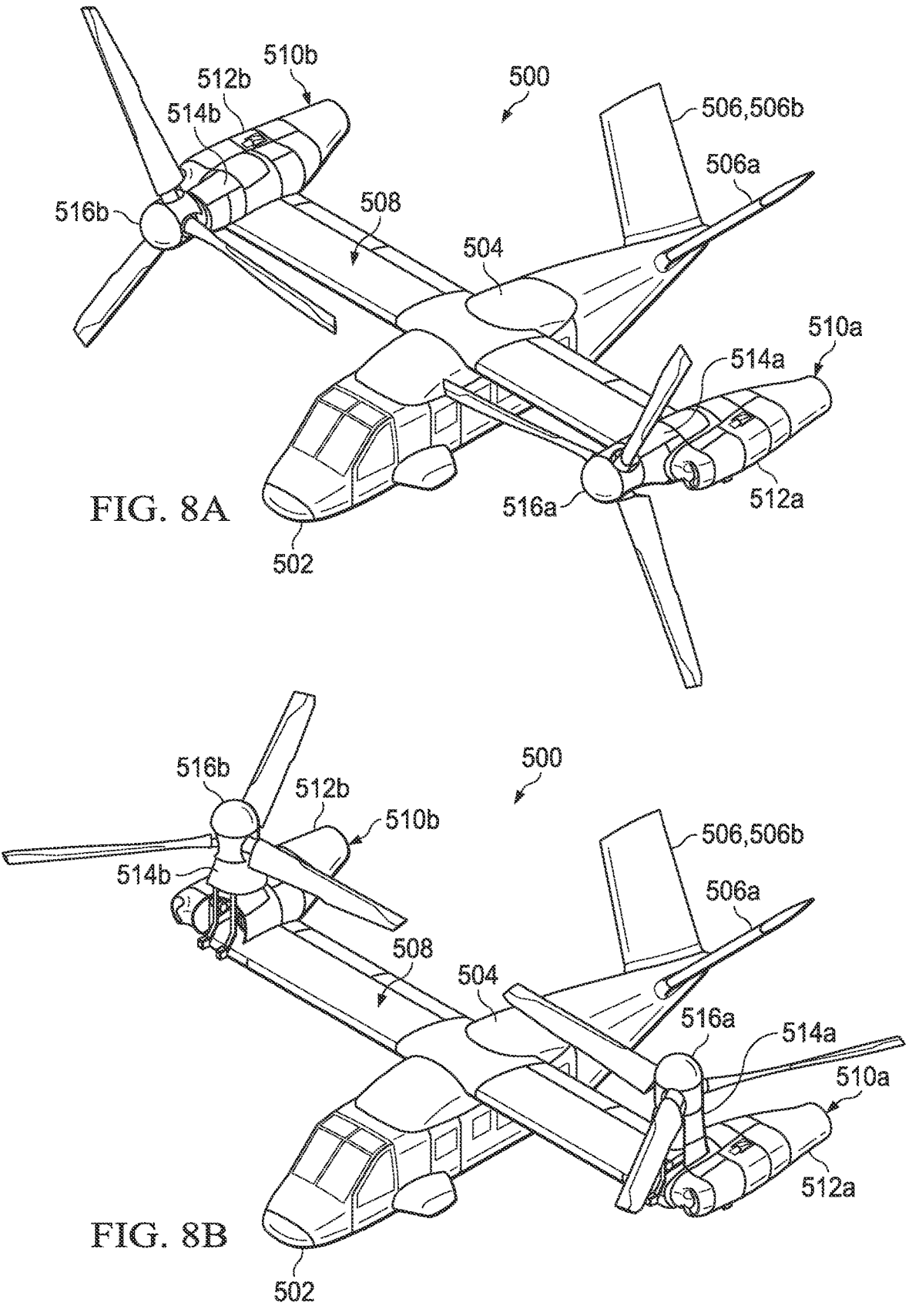
FIGS. 8A through 8F illustrate a tiltrotor aircraft including a self-sealing structure, in accordance with some embodiments.

FIGS. 8A through 8F illustrate a tiltrotor aircraft 500, which utilizes the self-sealing textile structures. The tiltrotor aircraft 500 includes a fuselage 502, a wing mount assembly 504, and a tail assembly 516 including rotatably mounted tail members 506a and 516b. The tail members 506a and 516b include control surfaces operable for horizontal and/or vertical stabilization during forward flight. A wing assembly 508 is supported by the wing mount assembly 504. Propulsion assemblies 510a and 510b are coupled to outboard ends of the wing assembly 508. The propulsion assembly 510a includes a nacelle depicted as fixed pylon 512a that houses an engine and a transmission. The nacelle may be fixed relative to the wing assembly 508. The propulsion assembly 510a further includes a mast assembly 514a having a mast that is rotatable relative to the fixed pylon 512a, the wing assembly 508, and the fuselage 502 between a generally horizontal orientation, as illustrated in FIG. 8A, and a generally vertical orientation, as illustrated in FIG. 8B. The propulsion assembly 510a also includes a proprotor assembly 516a, including proprotor blade assemblies radiating therefrom, which is rotatable responsive to torque and rotational energy provided via a rotor hub assembly and a drive system mechanically coupled to the engine and the transmission housed by the fixed pylon 512a. Similarly, the propulsion assembly 510b includes a nacelle depicted as fixed pylon 512b that houses an engine and a transmission and a mast assembly 514b that is rotatable relative to the fixed pylon 512b, the wing assembly 508, and the fuselage 502. The propulsion assembly 510b also includes a proprotor assembly 516b, including proprotor blade assemblies radiating therefrom, which is rotatable responsive to torque and rotational energy provided via a rotor hub assembly and a drive system mechanically coupled to the engine and the transmission housed by the fixed pylon 512b.

FIG. 8A illustrates the tiltrotor aircraft 500 in an airplane or forward flight mode, in which the mast assemblies 514a and 514b are oriented in a generally horizontal orientation and the proprotor assemblies 516a and 516b are rotating in a substantially vertical plane to provide a forward thrust enabling wing assembly 508 to provide a lifting force responsive to forward airspeed, such that the tiltrotor aircraft 500 flies much like a conventional propeller-driven aircraft. FIG. 8B illustrates the tiltrotor aircraft 500 in a helicopter or vertical takeoff and landing (VTOL) flight mode, in which the mast assemblies 514a and 514b are oriented in a generally horizontal orientation and the proprotor assemblies 516a and 516b are rotating in a substantially horizontal plane to provide a lifting thrust, such that the tiltrotor aircraft 500 flies much like a conventional helicopter. It should be appreciated that the tiltrotor aircraft 500 can be operated such that the proprotor assemblies 516a and 516b are selectively positioned between the forward flight mode and the VTOL flight mode, which can be referred to as a conversion flight mode. Even though the tiltrotor aircraft 500 has been described as having one engine in each of the fixed pylons 512a and 512b, other engine arrangements are possible and are considered to be within the scope of the present disclosure including, for example, having a single engine which may be housed within the fuselage 502 that provides torque and rotational energy to both of the proprotor assemblies 516a and 516b.

The tiltrotor aircraft 500 includes a fuel system 518, which includes one or more fuel cells 520 disposed inside the wing assembly 508. The fuel cells 520 may be bags or bladders that are flexible, semi-rigid, or rigid. For example, the fuel cells 520 may be fuel bags formed from a para-aramid material (e.g., Kevlar), elastomer, or the like. In some embodiments, the fuel cells 520 may be tanks, which may be formed from rigid materials, such as metals, polymers, plastics, or the like. The fuel system 518 may include one or more fuel pumps 522, which may be used to transfer fuel from the fuel cells 520.

Figures 8C, 8D, 8E, 8F:
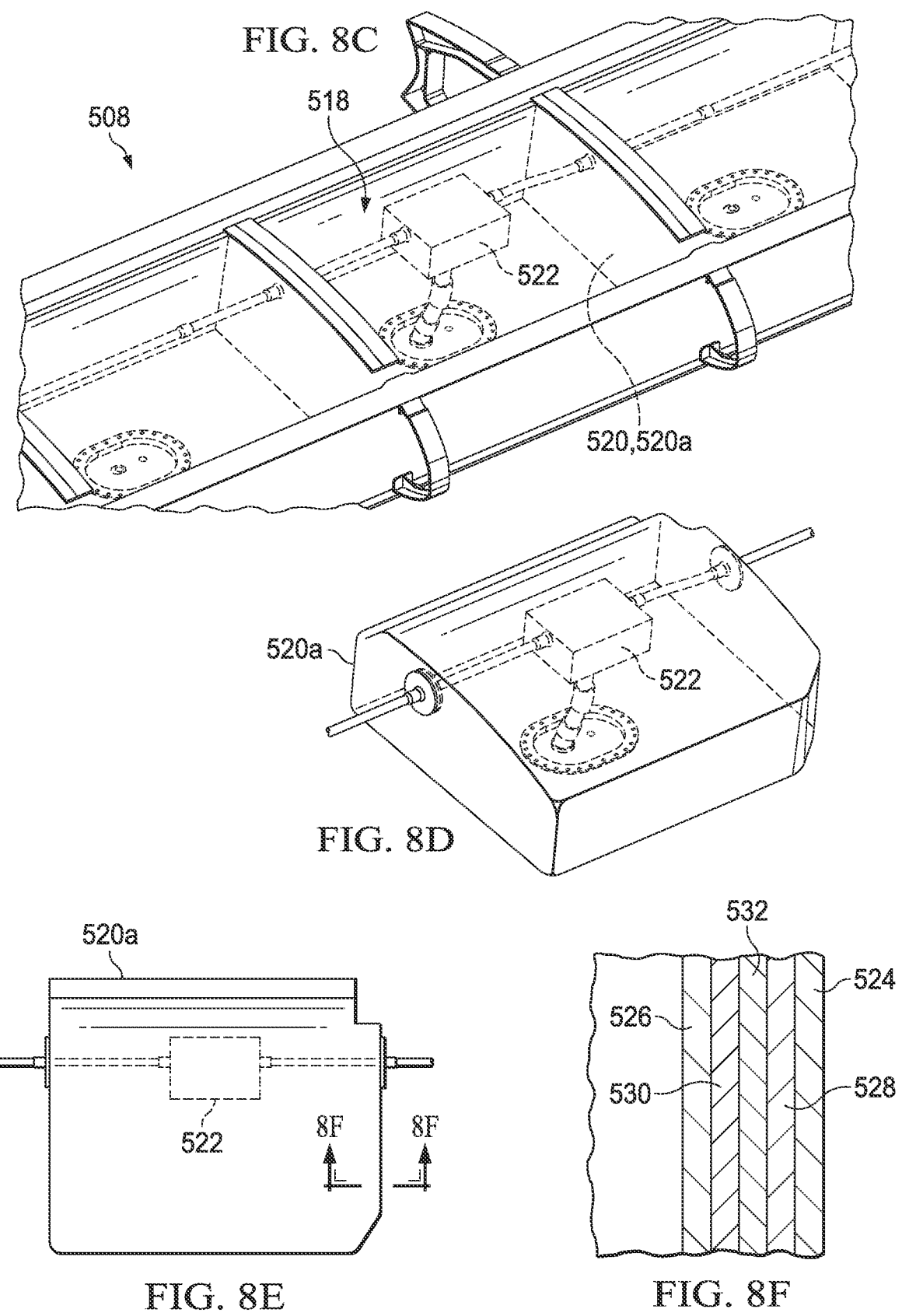

FIG. 8F illustrates a cross-sectional view of a wall of a fuel cell 520a, which is one of the fuel cells 520. The wall of the fuel cell 520a includes an outer layer 524, an inner layer 526, an outer intermediate layer 528, an inner intermediate layer 530, and a self-sealing textile structure 532 interposed between the outer intermediate layer 528 and the inner intermediate layer 530. In some embodiments, the outer intermediate layer 528 and/or the inner intermediate layer 530 may be omitted from the wall of the fuel cell 520a. The inclusion of the self-sealing textile structure 532 on the fuel system 518 of the tiltrotor aircraft 500 is illustrative of the wide variety of fuel systems with which the self-sealing textile of the disclosed embodiments may be used. This includes fuel systems located anywhere on an aircraft, such as the fuselage 502, the wing assembly 508, or elsewhere. The self-sealing textile of the illustrative embodiments may also be used on external fuel systems.

FIGS. 9A through 9C illustrate a transportable water tank 600, which utilizes the self-sealing textile structures. Water may be a valuable resource in certain operational scenarios, such as forward-operating bases. Projectiles may impact the water tank 600, causing water to leak from the water tank

600 and wasting a valuable resource. Because the self-sealing textile structures of the disclosed embodiments do not rely on contact with fuel or other aromatics to be activated or triggered, the self-sealing textile structures may be used in non-fuel applications, such as the water tank 600.

As illustrated in FIG. 9B, a wall of the water tank 600 includes a self-sealing textile structure 602 between an outer layer 604 and an inner layer 606. In some embodiments, the outer layer 604 may be omitted and the self-sealing textile structure 602 may be adhered to the outside of the inner layer 606. The illustrated water tank 600 also includes self-sealing textile patches 608 and 610 coupled to a side and rear of the water tank 600, respectively. The self-sealing textile of the disclosed embodiments may also be used in hose or transport applications.

FIG. 9C illustrates a cross-sectional view of a hose 612 used to extract water from the water tank 600. The hose 612 includes a self-sealing textile structure 614 interposed between an outer layer 616 and an inner liner 618. The self-sealing textile structure 614 prevents water from leaking from the hose 612 in the event that the hose 612 is pierced by an object or projectile. Thus, the self-sealing textile of the disclosed embodiments may be used in both storage and transport applications for any liquid. While the water tank 600 is illustrated as being movable, the self-sealing textile may also be used in walls of enclosures that are fixed objects on the ground, such as a water tower or the like. In some embodiments, the self-sealing textile may be used in a wall of a flat panel that is not part of an enclosure.

In other embodiments, the self-sealing textile layer may be a multilayer self-sealing structure providing self-sealing features. In particular, one or more UHMWPE layers may be provided between sealing liner layers, such as a elastomer layers, with the UHMWPE layers acting as slip layers. This permits the sealing liner layers to slide or slip in relation to each other to provide enhanced self-sealing capabilities while reducing weight of a fuel cell. In some embodiments, the slip layers may be solid UMHWPE or a high-performance polyethylene (HPPE) layer. Additionally, in some embodiments, the sealing liner layers may be an elastomer material such as a natural rubber, or a synthetic rubber or synthetic rubber analog. The slip layers have low friction with the elastomer materials of the sealing liner layers, permitting the sealing liner layers to slide between the slip layers in order to fill a hole formed in the self-sealing structure. The slip layers permitting the sealing liner layers to slides or move into a hole in response to a projectile creating the hole causes the sealing liner layers to physically seal or block the hole to stop leaks and prevent fuel escape through the hole.

Using multiple rubber sealing liner layers with interposed slip layers permits the use of relatively thin sealing liner layers and less overall material, lowering weight of a fuel tank compared to traditional fuel tank structures. Additionally, slip layers may be combined with self-sealing textile layers and elastomer sealing liner layers to improve ballistic and self-sealing performance while reducing fuel tank weight. In some embodiments, the sealing liner layers can be constructed of elastomers such as natural rubber or fuel resistant synthetic rubber, including Nitrile rubber (Buna-N or nitrile-butadiene rubber(NBR)) or Vitron® rubber, or may be another synthetic rubber or elastomer such as another fluorocarbon rubber, fluoropolymer elastomer, silicone rubber, styrene-butadiene rubber (SBR), thermoplastic elastomers, or the like. Using fuel resistant synthetic rubbers can address the concerns of fuel permeation prematurely activating the self-sealing layers, and may reduce weight and cost associated with natural rubber, while providing improved ballistic protection.

In some embodiments, the slip layers may be temporarily mated or attached to an associated sealing liner layers during assembly of a tank structure so that the slip layer is held in place against the sealing liner layer, permitting other sealing liner layers to slide past the slip layer. For example, an adhesive, wax, fastener or other material or structure may be provided on one side of a slip layer to attach the slip layer to a sealing liner layer, with the opposite side of the slip layer providing the low-friction surface that contacts an adjacent sealing liner layer. Such an arrangement may be advantageously used during production of the sealing liner layer, with the slip layer acting as a transfer layer. Thus, when the sealing liner layer is rolled, the attached slip layer allows the sealing liner layer to be unrolled with the slip layer in place, and without the sealing layer liner sticking to itself.

Figure 10A:
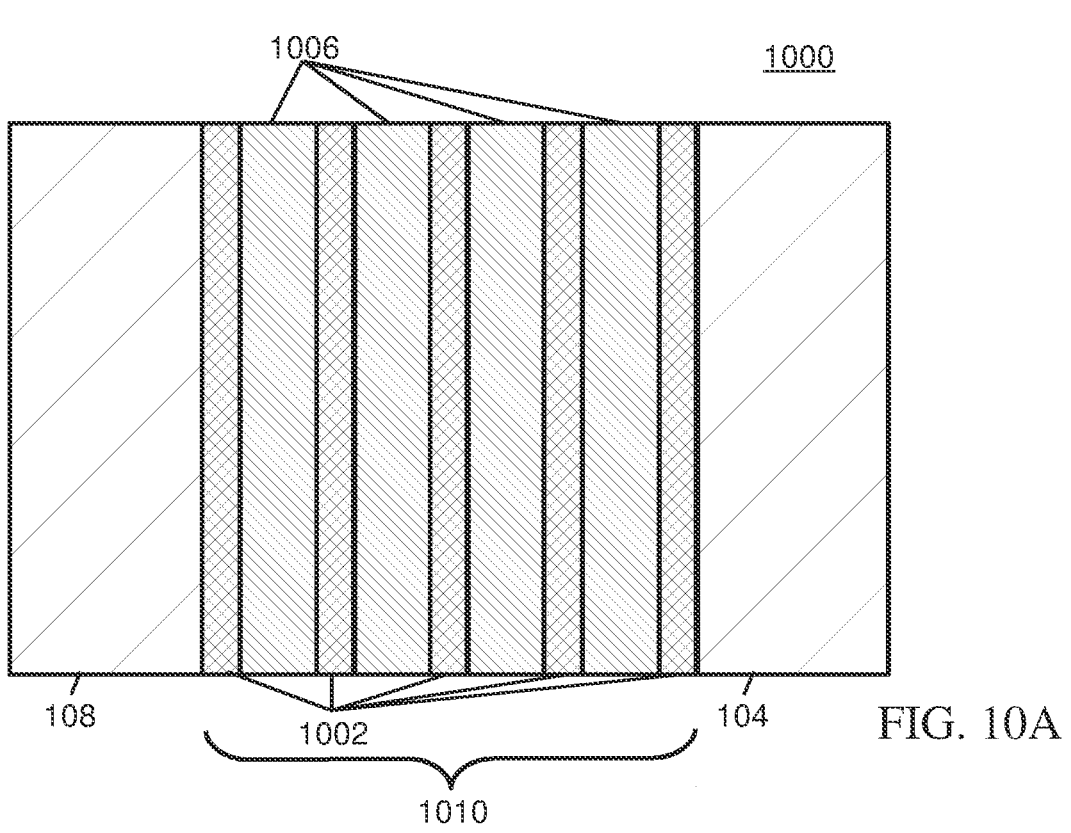
FIGS. 10A through 10F are diagrams illustrating a fluid containment cell structure having a multilayer self-sealing structure according to various embodiments.

FIG. 10A is a diagram illustrating a fluid containment cell structure 1000 having a multilayer self-sealing structure 1010. The multilayer self-sealing structure 1010 may be disposed between an outer layer 108 and an inner layer 104, and may have one or more sealing liner layers 1006 and one or more slip layers 1002. In some embodiments, the sealing liner layers 1006 may be a UHMWPE material such as a solid sheet of UMHWPE. Using UMHWPE permits sealing liner layers 1006 made from, for example, elastomer material such as a synthetic rubber, natural rubber or synthetic or natural rubber-based material, to slide between sheets of the slip layers 1002 to fill a projectile-created opening. In other embodiments, one or more layers of the sealing liner layers 1006 may be a HPPE material, such as a woven HPPE textile or other ballistic or self-sealing material with a non-stick coating such as polytetrafluoroethylene (PTFE), slip agent, anti-blocking agent, or other non-stick coating.

Using the sealing liner layers 1006 in combination with the slip layers 1002 permits the multilayer self-sealing structure 1010 to be lighter than a single, thick layer of elastomer or other sealing liner layer 1006, as the sealing liner layers sliding into a projectile-created opening fills the opening more effectively than a single, thick sealing liner layer. For example, combining layers of elastomer sealing liner layers 1006 with UHMWPE slip layers 1002 results in a 63% reduction in weight for the self-sealing structure 1010 in contrast with a single layer of elastomer that provides comparable self-sealing properties.

In some embodiments, each layer of the sealing liner layers 1006 may be or comprise an elastomer material such as a natural or synthetic rubber material, a substantially elastomeric material, or an elastomer-based material. Additionally, each layer of the sealing liner layers may have a thickness between about 70 mils (0.070 inches) and about 25 mils (0.025 inches), and in some embodiments, may have a thickness of about 50 mils (0.050 inches).

Additionally, in some embodiments, each layer of the slip layers 1002 may be or comprise a polyethylene (PE) material such as Olefin, UHMWPE or HPPE, and may be between about 15 mils (0.015 inches) and about 3 mils (0.003 inches) thick, and in some embodiments, may have a thickness of about 5 mils (0.005 inches). In other embodiments, each slip layer 1002, or one or more slip layers 1002, may be formed from a nylon material, PTFE, Polyethylene terephthalate (PET), a urethane material, or the like.

In some embodiments, one or more slip layers 1002 may be disposed between the inner layer 104 and a first sealing liner layer 1006 to reduce friction between the first sealing liner layer 1006 and the inner layer 104. In some embodiments, one or more slip layers 1002 may be disposed between the outer layer to reduce friction between the second sealing liner layer 1006 and the outer layer 108. Additionally, one or more slip layers 1002 may be disposed between each adjacent pair of sealing liner layers 1006 to reduce friction between adjacent sealing liner layers 1006.

In some embodiments, the multilayer self-sealing structure 1010 may have a number of sealing liners layers 1006 selected according to ballistic protection requirements for a particular location or portion of a liquid containment cell. In some embodiments, the multilayer self-sealing structure 1010 may have between about 3 and about 12 sealing liner layers 1006, and in some embodiments, may have between about 6 and about 8 sealing liner layers 1006. Additionally, the multilayer self-sealing structure 1010 have a number of associated slip layers 1002 suitable for ensuring that the sealing liner layers 1006 move appropriately in response to projectile damage. For example, a multilayer self-sealing structure 1010 with 3 to 12 sealing liner layer 1006 may have between 4 and 13 slip layers, and a multilayer self-sealing structure 101 with between about 6 and about 8 sealing liner layers 1006 may have between 7 and 9 slip layers 1002, with a single sealing slip layer on the outside surfaces of the outer sealing liner layers 1006, and a single slip layer 1002 between adjacent sealing liner layers 1006. Thus, a multilayer self-sealing structure 1010 may have more slip layers than sealing liner layers 1006, and may have, for example, N sealing liner layers 1006 and N+1 slip layers 1002. Additionally, the number of sealing liner layers 1006 and slip layers 1002 in the multilayer self-sealing structure 1010 may be varied to address a particular threat level, and may vary in different areas of a liquid containment tank to address anticipated threat levels associated with a region of the vehicle in which the areas of the tank is disposed. For example, the number of sealing liner layers 1006 and slip layers 1002 may vary in different areas of a liquid containment tank when the areas are in exposed or exterior vehicle regions compared to shielded or interior vehicle regions.

Figure 10B:
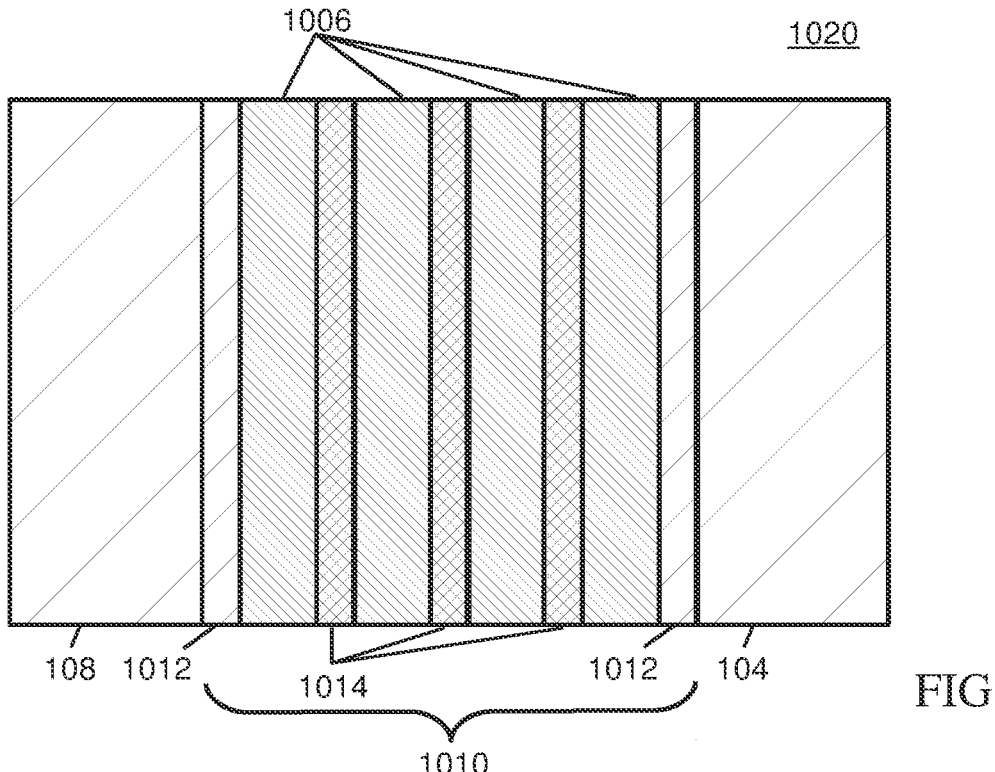

FIG. 10B is a diagram illustrating a fluid containment cell structure 1020 having a multilayer self-sealing structure 1010 with multiple slip layer types 1012, 1014 adjacent to the sealing liner layers 1006 according to some embodiments. In some embodiments, the multilayer self-sealing structure 1010 may have first slip layers 1014 and second slip layers 1012 made from different materials. For example, the first slip layers 1014 may be solid UMHWPE sheets, and the second slip layers 1012 may be woven HPPE textile with a non-stick coating such as PTFE, slip agents, anti-blocking agents, or the like. In some embodiments, the first slip layers 1014 may be disposed between adjacent sealing liner layers 1006, and the second slip layers 1012 may be disposed on the outside of the multilayer self-sealing structure 1010 between the sealing liner layers 1006 and the inner layer 104 or the outer layer 108. Thus, the first slip layers 1014 may provide lightweight reduction of friction between sealing liner layers 1006, and the second slip layers 1012 may provide additional ballistic protection for the multilayer self-sealing structure 1010.

Figure 10C:
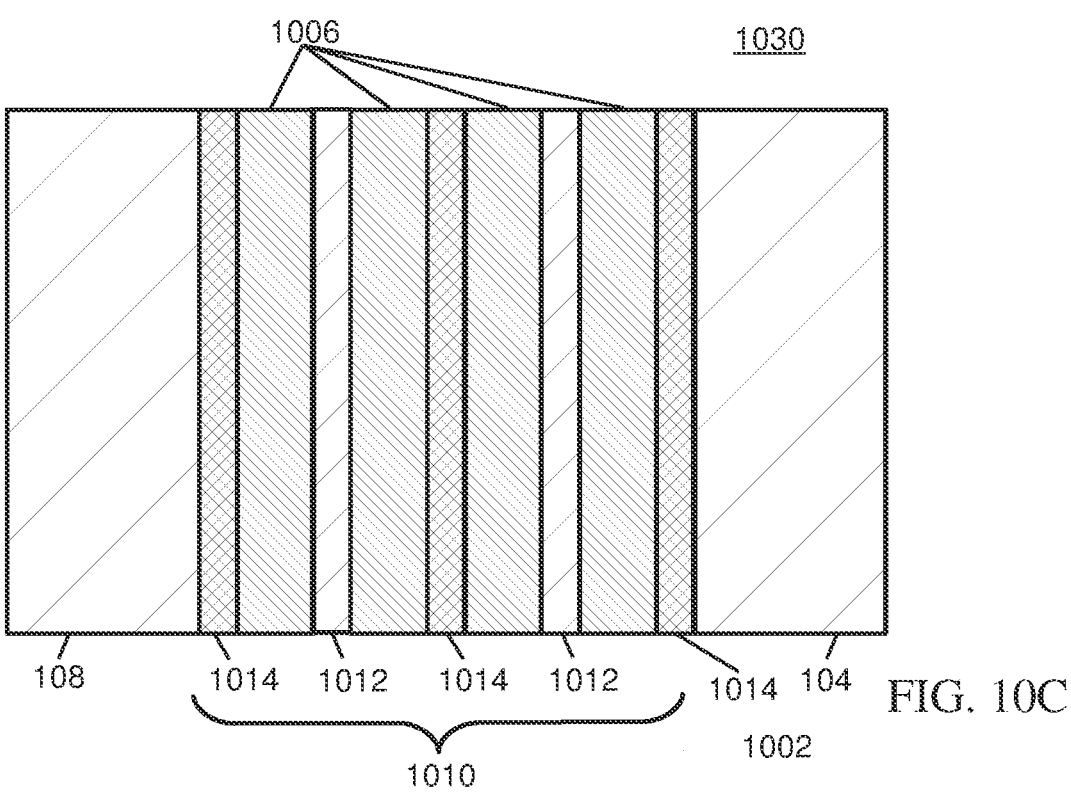

FIG. 10C is a diagram illustrating a fluid containment cell structure 1030 having a multilayer self-sealing structure 1010 with multiple slip layer types 1012, 1014 according to some embodiments. In some embodiments, the second slip layers 1012 may be inside the multilayer self-sealing structure 1010 between adjacent sealing liner layers 1006, and one or more first slip layers 1014 may disposed on the outside of the multilayer self-sealing structure 1010 as well as between one or more pairs of adjacent sealing liner layers 1006.

Figure 10D:
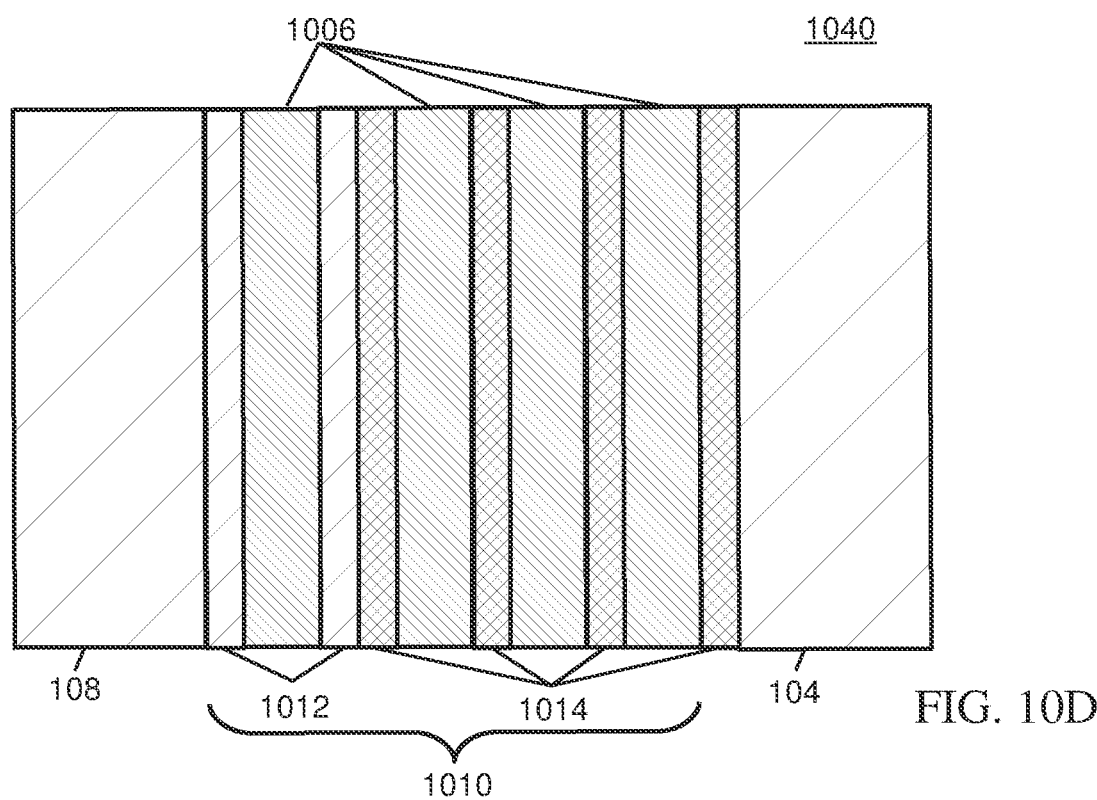

FIG. 10D is a diagram illustrating a fluid containment cell structure 1040 having a multilayer self-sealing structure 1010 with multiple slip layer types 1012, 1014 according to some embodiments. In some embodiments, second slip layers 1012 may be disposed on opposite sides of a single sealing liner layer 1006, and first slip layers 1014 may be disposed between, and outside, the remaining sealing liner layers 1006. Thus, the second slip layers 1012 may be secured to an outer sealing liner layer for use as a single layer during assembly of the multilayer self-sealing structure, while providing multiple layers of additional ballistic protection.

Figure 10E:
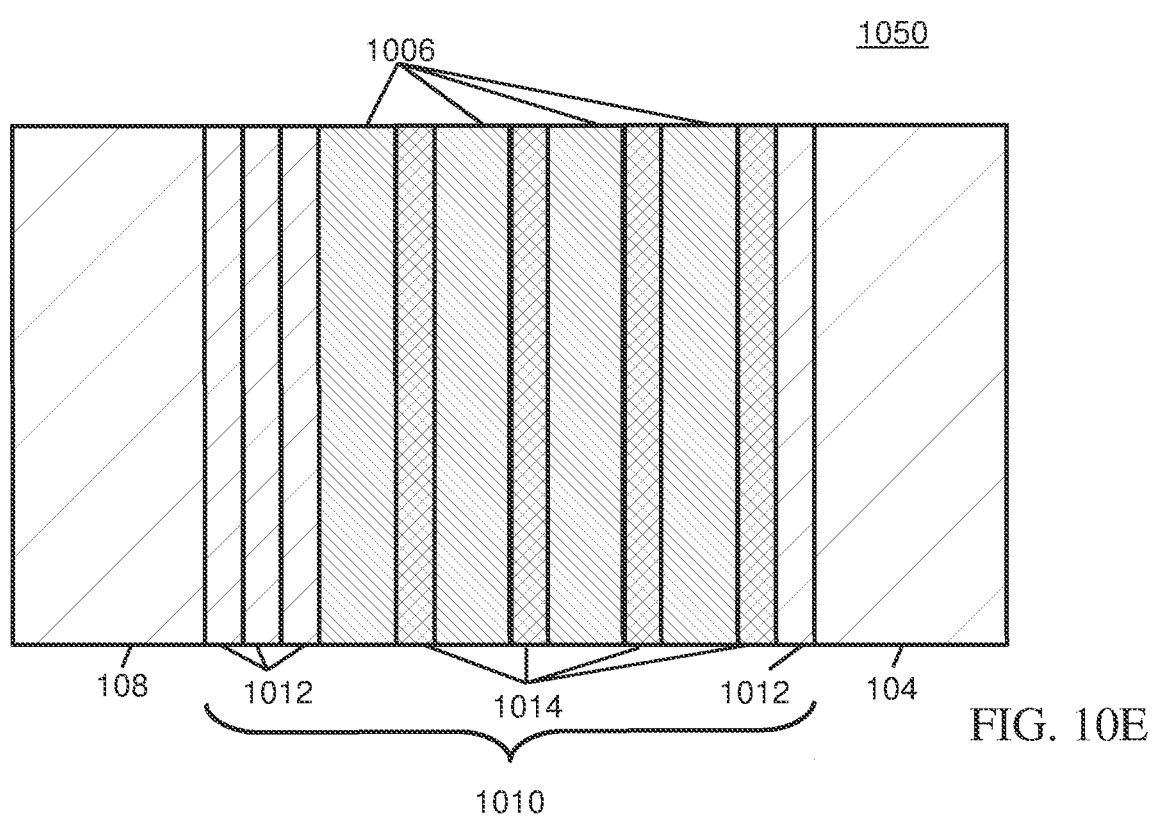

FIG. 10E is a diagram illustrating a fluid containment cell structure 1050 having a multilayer self-sealing structure 1010 with multiple slip layers 1012, 1014 directly adjacent to each other according to some embodiments. In some embodiments, one or more slip layers 1012, 1014 may be disposed directly adjacent to each other to provide a desired or calculated level of ballistic protection. For example, multiple second slip layers 1012 may be immediately adjacent to each other to achieve a desired level of ballistic protection using standard slip layer material thicknesses. In some embodiments, the multiple second slip layer 1012 structure may be disposed on the outside of the multilayer self-sealing structure 1010, between, for example, the outer layer 108 and a sealing liner layer 1006. One or more first slip layers 1002 may also be disposed between adjacent sealing liner layers 1006. Additionally, one or more additional second slip layers 1012 may be disposed in the multilayer self-sealing structure 1010, for example, on the outside of the multilayer self-sealing structure 1010 opposite the multiple second slip layers 1012 and between a sealing liner layer 1006 and the inner layer 104.

Figure 10F:
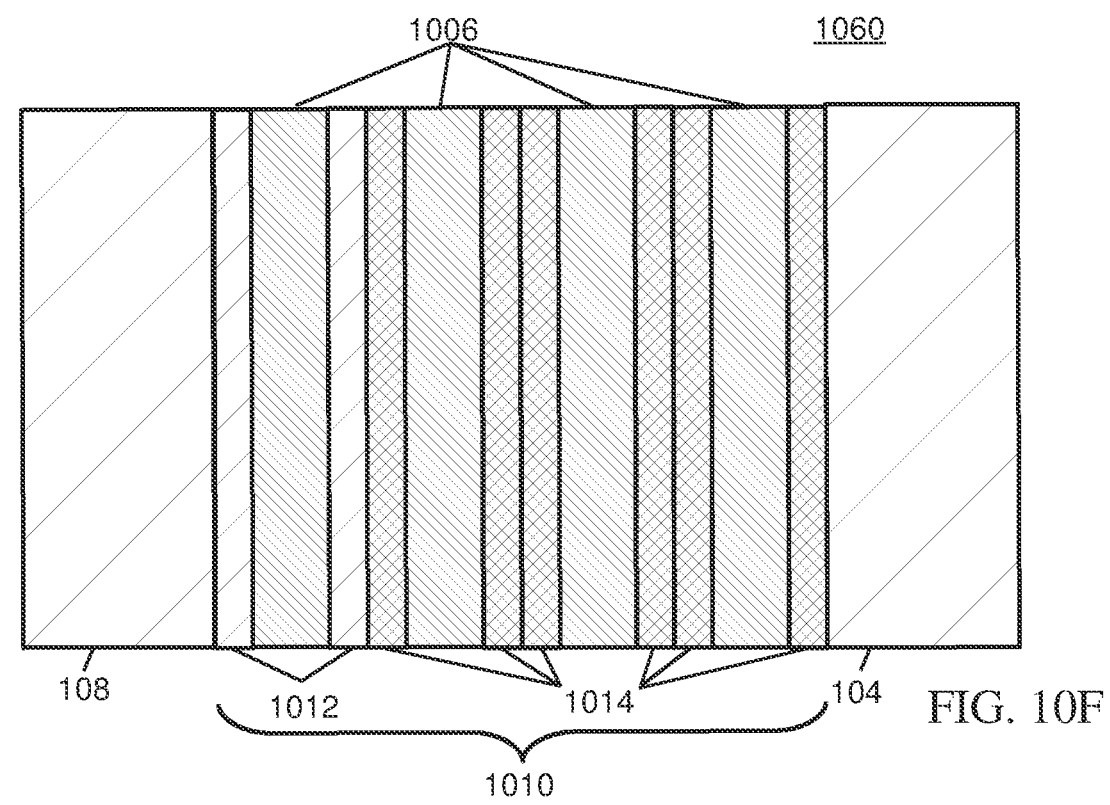

FIG. 10F is a diagram illustrating a fluid containment cell structure 1060 having a multilayer self-sealing structure 1010 with multiple slip layers 1012, 1014 directly adjacent to each other according to some embodiments. In some embodiments, multiple slip layers may be disposed directly adjacent to each other between adjacent sealing liner layers 1006. For example, multiple first slip layers 1014 may be immediately adjacent to each other and separating adjacent sealing liner layers 1006. Additionally, the types of slip layers may be varied, for example, by providing one or more second slip layers 1012 immediately adjacent to one or more first sealing liner layers 1006, and with first slip layers 1014 immediately adjacent to one or more second sealing liner layers 1006. The first slip layers 1014 may be directly adjacent to the second slip layers 1012, with the directly adjacent first slip layers 1014 and second slip layers 1012 separating the first and second sealing liner layers 1006. Thus, a second slip layer 1012 may be in contact with a first slip layer 1014 of the second sealing liner layer 1006.

The disclosed arrangements for the multilayer self-sealing structure 1010 may be provided, for example, by using sealing liner layers 1006 with one or more slip layers attached to the surface of the sealing liner layer 1006. The sealing liner layer/slip layer combination structure may then be processed for placement in the multilayer self-sealing structure, with subsequent layers of sealing liner layer/slip layer combination structure added to bring the ballistic and self-sealing properties of the multilayer self-sealing structure 1010 to a desired level. Thus, the multilayer self-sealing structure 1010 may be formed from multiple substructures, with each substructure including a sealing liner layer 1006 with at least one slip layer 1012, 1014 on a surface of the sealing liner layer 1006. In some embodiments, each substructure comprises a sealing liner layer 1006 with a slip layer 1012, 1014 on each side, which may be advantageously provided during manufacture, and shipped on rolls, with the slip layers 1012, 1014 acting as transfer layers to keep the rolled sealing liner layer 1006 from sticking to itself. In other embodiments, the substructure may be formed by two sealing liner layers that are placed back-to-back with a single slip layer 1012, 1014 on each of the two sealing liner layers 1006. The slip layers 1012, 1014 may be placed on the outside of the substructure so that the sealing liner layers 1006 bond to each other to form a unitary, single sealing liner layer 1006 with slip layers 1012, 1014 on opposing sides.

Figure 11:
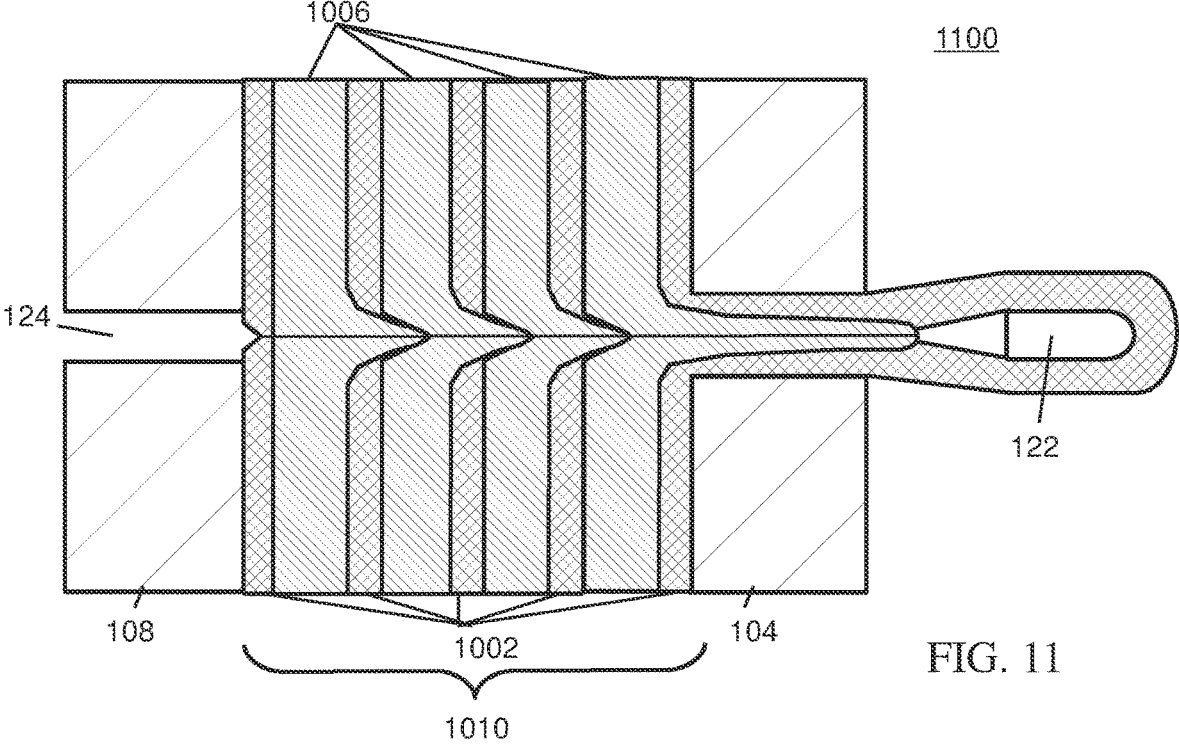
FIG. 11 is a diagram illustrating performance of the multilayer self-sealing structure, according to some embodiments, when penetrated by a projectile.

FIG. 11 is a diagram illustrating performance of the multilayer self-sealing structure 1010, according to some embodiments, when penetrated by a projectile 122. In some embodiments, the sealing liner layers 1006 are able to slide between the slip layers 1002 to fill a hole 124 created by the projectile 122. Additionally, since the friction between the slip layers 1002 and at least one adjacent sealing liner layer 1006 is low, the slip layers 1002 may also fill the hole 124, while providing ballistic protection by slowing the projectile 122. Friction between the projectile 122 and the sealing liner layers 1006, and between the projectile 122 and the slip layers 1002 pulls the sealing liner layers 1006 and slip layer 1002 into the hole 124 to seal the hole 124 after the projectile 122 passes through each layer. Similar to the self-sealing system described above, the physical sealing of the hole 124 avoids a need for aromatics or other chemicals in the fluid contained in the tank to activate the sealing liner layers 1006. Additionally, physically sealing the hole 124 immediately seals the hole 124.

An embodiment liquid containment cell includes an inner layer configured to contain a liquid, an outer layer, and a multilayer self-sealing structure disposed between the inner layer and the outer layer, where the multilayer self-sealing structure includes a plurality of sealing liner layers and further includes at least one slip layer disposed between adjacent sealing liner layers of the plurality of sealing liner layers. The at least one slip layer includes a polyethylene (PE) material, and the at least one slip layer is configured to permit at least one sealing liner layer of the plurality of sealing liner layers to move at least partially into a hole created by a projectile.

In some embodiments, the at least one slip layer includes at least one first slip layer that is a solid sheet of ultra-high molecular weight polyethylene (UHMWPE). In some embodiments, the at least one slip layer further includes at least one second slip layer that is a woven sheet of a high-performance polyethylene (HPPE). In some embodiments, the woven HPPE sheet has at least one surface with a non-stick coating disposed thereon. In some embodiments, each sealing liner layer of the plurality of sealing liner layers includes a substantially elastomer material. In some embodiments, each layer of the plurality of sealing liner layers has a thickness between about 70 mils and about 25 mils, and the at least one slip layer has a thickness between about 15 mils and about 3 mils. In some embodiments, the plurality of sealing liner layers includes at least 6 sealing liner layers, the at least one slip layer includes a plurality of slip layers, and one or more slip layers of the plurality of slip layers is disposed between each sealing liner layer of the plurality of sealing liner layers and a next sealing liner layers of the plurality of sealing liner layers.

An embodiment aircraft includes a fuselage, a liquid containment cell configured to store a liquid, the liquid containment cell including an inner layer configured to contact the liquid, an outer layer, and a self-sealing structure disposed between the inner layer and the outer layer, the self-sealing structure including a plurality of sealing liner layers and further comprising a plurality of slip layers, where each sealing liner layer of the plurality of sealing liner layers is separated from an immediately next sealing liner layer of the plurality of sealing liner layers by at least one slip layer of the plurality of slip layers, where each slip layer of the plurality of slip layers includes a polyethylene (PE) material, and where each sealing liner layer of the plurality of sealing liner layers includes an elastomer material.

In some embodiments, at least one first slip layer of the plurality of slip layers includes a solid sheet of ultra-high molecular weight polyethylene (UHMWPE). In some embodiments, at least second one slip layer of the plurality of slip layers includes a woven sheet of a high-performance polyethylene (HPPE). In some embodiments, at least one slip layer of the plurality of slip layers is disposed at an outside surface of the self-sealing structure and the outer layer, and where a different slip layer of the plurality of slip layers is disposed between the inner layer and the self-sealing structure. In some embodiments, the self-sealing structure includes a plurality of second slip layers disposed on an outside surface of the self-sealing structure and disposed between the outer layer and the plurality of sealing liner layers. In some embodiments, a first slip layer of the plurality of slip layers is attached to a first side of a first sealing liner layer of the plurality of sealing line layers, wherein a second slip layer of the plurality of slip layers is attached to a second side of a second sealing liner layer of the plurality of sealing line layers, wherein the first side faces the second side, and where the first slip layer is in direct contact with the second slip layer. In some embodiments, each layer of the plurality of sealing liner layers has a thickness between about 70 mils and about 25 mils, and each one slip layer of the plurality of slip layers has a thickness between about 15 mils and about 3 mils. In some embodiments, the plurality of sealing liner layers includes at least 6 sealing liner layers. In some embodiments, at least one of a number of sealing liner layers of the plurality of sealing liner layers or a number of slip layers of the plurality of slip layers in the self-sealing structure in different areas of the liquid containment cell is associated with anticipated threat levels associated with a region of the aircraft in which respective areas of the liquid containment cell are disposed.

An embodiment method for sealing a liquid containment cell includes providing a liquid containment cell, the liquid containment cell, comprising a multilayer self-sealing structure around an inner layer of the liquid containment cell, the multilayer self-sealing structure including a plurality of sealing liner layers and further comprising a plurality of slip layers, where each sealing liner layer of the plurality of sealing liner layers is separated from an immediately next sealing liner layer of the plurality of sealing liner layers by at least one slip layer of the plurality of slip layers, where each slip layer of the plurality of slip layers includes a polyethylene (PE) material, and where each sealing liner layer of the plurality of sealing liner layers is formed from a material including an elastomer, receiving a projectile into at least the multilayer self-sealing structure, the projectile forming a hole through the plurality of sealing liner layers and through the inner layer, and sealing the hole by sliding at least one sealing liner layer of the plurality of sealing liner layers, with respect to the inner layer and with respect to another sealing liner layer of the plurality of sealing liner layers, the sliding causing the at least one sealing liner layers to fill at least a portion of the hole.

In some embodiments, at least one slip layer of the plurality of slip layers includes is a solid sheet of ultra-high molecular weight polyethylene (UHMWPE), where least one slip layer of the plurality of slip layers is a woven sheet of a high-performance polyethylene (HPPE), and where each sealing liner layer of the plurality of sealing liner layers includes an elastomer material. In some embodiments, the woven HPPE sheet has at least one surface with a non-stick coating disposed thereon. In some embodiments, each layer of the plurality of sealing liner layers has a thickness between about 70 mils and about 25 mils, and wherein each slip layer of the plurality of slip layers has a thickness between about 15 mils and about 3 mils.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A liquid containment cell comprising:
an inner layer configured to contain a liquid;
an outer layer; and
a multilayer self-sealing structure disposed between the inner layer and the outer layer, wherein the multilayer self-sealing structure comprises a plurality of sealing liner layers and further comprises at least one slip layer disposed between adjacent sealing liner layers of the plurality of sealing liner layers, and wherein each sealing liner layer of the plurality of sealing liner layers comprises a liquid resistant material that is configured to be non-reactive with the liquid;
wherein the at least one slip layer comprises a polyethylene (PE) material, and wherein the at least one slip layer is configured to permit at least one sealing liner layer of the plurality of sealing liner layers to slide or slip in relation to another sealing liner layer of the plurality of sealing liner layers and move at least partially into a hole created by a projectile by being pulled into the hole by the projectile to plug the hole.

2. The liquid containment cell of claim 1, wherein the at least one slip layer comprises at least one first slip layer that is a solid sheet of ultra-high molecular weight polyethylene (UHMWPE).

3. The liquid containment cell of claim 2, wherein the at least one slip layer further comprises at least one second slip layer that is a woven sheet of a high-performance polyethylene (HPPE).

4. The liquid containment cell of claim 3, wherein the woven HPPE sheet has at least one surface with a non-stick coating disposed thereon.

5. The liquid containment cell of claim 1, wherein each sealing liner layer of the plurality of sealing liner layers comprises a substantially elastomeric material.

6. The liquid containment cell of claim 5, wherein each layer of the plurality of sealing liner layers has a thickness between about 70 mils and about 25 mils, and wherein the at least one slip layer has a thickness between about 15 mils and about 3 mils.

7. The liquid containment cell of claim 1, wherein the plurality of sealing liner layers comprises at least 6 sealing liner layers, and wherein the at least one slip layer comprises a plurality of slip layers, wherein one or more slip layers of the plurality of slip layers is disposed between each sealing liner layer of the plurality of sealing liner layers and a next sealing liner layers of the plurality of sealing liner layers.

8. An aircraft comprising:
a fuselage;
a liquid containment cell configured to store a liquid, the liquid containment cell comprising:
an inner layer configured to contact the liquid;
an outer layer; and
a self-sealing structure disposed between the inner layer and the outer layer, the self-sealing structure comprising a plurality of sealing liner layers and further comprising a plurality of slip layers, wherein each sealing liner layer of the plurality of sealing liner layers comprises a liquid resistant material that is configured to be non-reactive with the liquid;
wherein each sealing liner layer of the plurality of sealing liner layers is separated from an immediately next sealing liner layer of the plurality of sealing liner layers by at least one slip layer of the plurality of slip layers; and
wherein each slip layer of the plurality of slip layers comprises a polyethylene (PE) material, wherein each sealing liner layer of the plurality of sealing liner layers comprises an elastomer material, wherein each slip layer of the plurality of slip layers is configured to permit at least one sealing liner layer of the plurality of sealing liner layers to slide or slip in relation to another sealing liner layer of the plurality of sealing liner layers and move at least partially into a hole created by a projectile by being pulled into the hole by the projectile to plug the hole.

9. The aircraft of claim 8, wherein at least one first slip layer of the plurality of slip layers comprises a solid sheet of ultra-high molecular weight polyethylene (UHMWPE).

10. The aircraft of claim 9, wherein at least one second slip layer of the plurality of slip layers comprises a woven sheet of a high-performance polyethylene (HPPE).

11. The aircraft of claim 10, wherein at least one slip layer of the plurality of slip layers is disposed between an outside surface of the self-sealing structure and the outer layer, and wherein a different slip layer of the plurality of slip layers is disposed between the inner layer and the self-sealing structure.

12. The aircraft of claim 10, wherein the self-sealing structure comprises a plurality of second slip layers disposed on an outside surface of the self-sealing structure and disposed between the outer layer and the plurality of sealing liner layers.

13. The aircraft of claim 9, wherein a first slip layer of the plurality of slip layers is attached to a first side of a first sealing liner layer of the plurality of sealing liner layers, wherein a second slip layer of the plurality of slip layers is attached to a second side of a second sealing liner layer of the plurality of sealing liner layers, wherein the first side faces the second side, and wherein the first slip layer is in direct contact with the second slip layer.

14. The aircraft of claim 8, wherein each layer of the plurality of sealing liner layers has a thickness between about 70 mils and about 25 mils, and wherein each one slip layer of the plurality of slip layers has a thickness between about 15 mils and about 3 mils.

15. The aircraft of claim 8, wherein the plurality of sealing liner layers comprises at least 6 sealing liner layers.

16. The aircraft of claim 8, wherein at least one of a number of sealing liner layers of the plurality of sealing liner layers or a number of slip layers of the plurality of slip layers in the self-sealing structure in different areas of the liquid containment cell is associated with anticipated threat levels associated with a region of the aircraft in which respective areas of the liquid containment cell are disposed.

17. A method for sealing a liquid containment cell, the method comprising:

providing a liquid containment cell, the liquid containment cell comprising a multilayer self-sealing structure around an inner layer of the liquid containment cell, the multilayer self-sealing structure comprising a plurality of sealing liner layers and further comprising a plurality of slip layers, wherein each sealing liner layer of the plurality of sealing liner layers is separated from an immediately next sealing liner layer of the plurality of sealing liner layers by at least one slip layer of the plurality of slip layers, wherein each slip layer of the plurality of slip layers comprises a polyethylene (PE) material, and wherein each sealing liner layer of the plurality of sealing liner layers is formed from a material comprising an elastomer, and wherein each sealing liner layer of the plurality of sealing liner layers comprises a liquid resistant material that is configured to be non-reactive with the liquid;

receiving a projectile into at least the multilayer self-sealing structure, the projectile forming a hole through the plurality of sealing liner layers and through the inner layer; and sealing the hole by sliding at least one sealing liner layer of the plurality of sealing liner layers, with respect to the inner layer and with respect to another sealing liner layer of the plurality of sealing liner layers, the sliding causing the at least one sealing liner layers to fill at least a portion of the hole by being pulled into the hole by the projectile to plug the hole.

18. The method of claim 17, wherein at least one slip layer of the plurality of slip layers comprises a solid sheet of ultra-high molecular weight polyethylene (UHMWPE), wherein at least one slip layer of the plurality of slip layers is a woven sheet of a high performance polyethylene (HPPE), and wherein each sealing liner layer of the plurality of sealing liner layers comprises rubber.

19. The method of claim 18, wherein the woven HPPE sheet has at least one surface with a non-stick coating disposed thereon.

20. The method of claim 18, wherein each layer of the plurality of sealing liner layers has a thickness between about 70 mils and about 25 mils, and wherein each slip layer of the plurality of slip layers has a thickness between about 15 mils and about 3 mils.

* * * * *